US012754536B2

(12) United States Patent
Shigemori

(10) Patent No.: US 12,754,536 B2
(45) Date of Patent: Oct. 6, 2026

(54) QUALITY ABNORMALITY ANALYSIS METHOD, METHOD OF MANUFACTURING METAL MATERIAL, AND QUALITY ABNORMALITY ANALYSIS DEVICE

(71) Applicant: JFE STEEL CORPORATION, Tokyo (JP)

(72) Inventor: Hiroyasu Shigemori, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 468 days.

(21) Appl. No.: 18/270,679

(22) PCT Filed: Nov. 8, 2021

(86) PCT No.: PCT/JP2021/040936

§ 371 (c)(1),
(2) Date: Jun. 30, 2023

(87) PCT Pub. No.: WO2022/149344

PCT Pub. Date: Jul. 14, 2022

(65) Prior Publication Data

US 2024/0295874 A1 Sep. 5, 2024

(30) Foreign Application Priority Data

Jan. 6, 2021 (JP) ................................ 2021-000695

(51) Int. Cl.
*G05B 19/418* (2006.01)

(52) U.S. Cl.
CPC .................. *G05B 19/41875* (2013.01); *G05B 2219/32368* (2013.01)

(58) Field of Classification Search
None
See application file for complete search history.

(56) References Cited

U.S. PATENT DOCUMENTS 7,493,185 B2 * 2/2009 Cheng .............. G05B 19/41875 700/47
2003/0061004 A1 * 3/2003 Discenzo ............... G06Q 10/06 702/182

(Continued)

FOREIGN PATENT DOCUMENTS

CN 101689051 A 3/2010
CN 102033523 A * 4/2011

(Continued)

OTHER PUBLICATIONS

May 7, 2024 Extended Search Report issued in European Patent Application No. 21917569.2.

(Continued)

*Primary Examiner* — Jason Lin
(74) *Attorney, Agent, or Firm* — Oliff PLC

(57) ABSTRACT

A quality abnormality analysis method for a product manufactured by a manufacturing process includes: predicting quality of the product by inputting manufacturing conditions to a quality prediction model generated by using a plurality of manufacturing conditions of the manufacturing process as input variables and using the quality of the product as an output variable; calculating a quality evaluation value of an actual product manufactured by the manufacturing process; calculating, as a quality prediction error, a difference between a quality prediction value obtained as an output and the quality evaluation value; a quality contribution calculation step of quality contribution degrees of the input manufacturing conditions when predicting the quality of the product using the quality prediction model; and presenting, based on the quality prediction error and the quality contribution degree, a manufacturing condition causing a quality abnormality of the product.

6 Claims, 17 Drawing Sheets

(56) References Cited

U.S. PATENT DOCUMENTS

| | | | | |
|---|---|---|---|---|
| 2008/0100570 | A1* | 5/2008 | Friedrich | G05B 19/4183 345/156 |
| 2010/0106458 | A1* | 4/2010 | Leu | F04B 49/065 702/181 |
| 2015/0324329 | A1* | 11/2015 | Blevins | G05B 23/024 |
| 2016/0170996 | A1* | 6/2016 | Frank | G06F 16/904 707/748 |
| 2016/0352762 | A1* | 12/2016 | Friedlander | H04L 63/1425 |
| 2017/0109646 | A1* | 4/2017 | David | G03F 7/70625 |
| 2017/0156674 | A1* | 6/2017 | Hochman | A61B 3/1241 |
| 2018/0033130 | A1* | 2/2018 | Kimura | G06F 18/22 |
| 2018/0150038 | A1 | 5/2018 | Lin et al. | |
| 2018/0316719 | A1* | 11/2018 | Schneider | H04L 63/1441 |
| 2020/0310380 | A1* | 10/2020 | Sun | G05B 23/0272 |
| 2020/0401120 | A1* | 12/2020 | Putman | G05B 19/41875 |
| 2024/0295874 | A1 | 9/2024 | Shigemori | |

FOREIGN PATENT DOCUMENTS

| | | | |
|---|---|---|---|
| CN | 111506030 | A | 8/2020 |
| CN | 116724328 | A | 9/2023 |
| EP | 2161636 | A1 | 3/2010 |
| JP | 2004-355189 | A | 12/2004 |
| JP | 2006-309709 | A | 11/2006 |
| JP | 2008-112288 | A | 5/2008 |
| JP | 2009-230412 | A | 10/2009 |
| JP | 2014-013560 | A | 1/2014 |
| JP | 2014-071858 | A | 4/2014 |
| JP | 2014-071859 | A | 4/2014 |
| JP | 2017-120638 | A | 7/2017 |
| JP | 2017-161991 | A | 9/2017 |
| JP | 2018-113027 | A | 7/2018 |
| JP | 2020-128975 | A | 8/2020 |
| TW | 200629117 | A | 8/2006 |
| TW | 201820064 | A | 6/2018 |

OTHER PUBLICATIONS

Jan. 25, 2022 International Search Report issued in International Patent Application No. PCT/JP2021/040936.

Jan. 25, 2022 Written Opinion of the International Searching Authority issued in International Patent Application No. PCT/JP2021/040936.

Sep. 5, 2022 Office Action issued in Taiwanese Patent Application No. 110143174.

May 9, 2025 Office Action issued in Korean Patent Application No. 10-2023-7022030.

Aug. 23, 2025 Office Action issued in Chinese Patent Application No. 202180089024.7.

* cited by examiner

FIG.3

ACTUAL VALUES OF PLURALITY OF MANUFACTURING CONDITIONS (AND QUALITY)

OBSERVATION DATA OF PLURALITY OF FIXED PERIODS (TIME UNIT)

| TIME | SPEED | MANUFACTURING CONDITION 1 | MANUFACTURING CONDITION 2 | … |
|---|---|---|---|---|
| $t^1$ | $v^1$ | $x_1^{\ 1}$ | $x_2^{\ 1}$ | … |
| $t^2$ | $v^2$ | $x_1^{\ 2}$ | $x_2^{\ 2}$ | … |
| ⋮ | ⋮ | ⋮ | ⋮ | |

ACTUAL VALUES OF PLURALITY OF MANUFACTURING CONDITIONS (AND QUALITY)

OBSERVATION DATA OF PLURALITY OF FIXED PERIODS (LENGTH UNIT)

| LENGTH | MANUFACTURING CONDITION 1 | MANUFACTURING CONDITION 2 | ... |
|---|---|---|---|
| $l^1$ | $x_1^1$ | $x_2^1$ | ... |
| $l^2$ | $x_1^2$ | $x_2^2$ | ... |
| ⋮ | ⋮ | ⋮ | |

FIG.7

QUALITY

MANUFACTURING CONDITIONS (M PIECES) OF ALL PROCESSES

N PIECES OF OBSERVATION DATA

| $Y$ | $X_1$ | $X_2$ | ⋯ | $X_m$ | ⋯ | $X_M$ |
|---|---|---|---|---|---|---|
| $y^1$ | $x_1{}^1$ | $x_2{}^1$ | ⋯ | $x_m{}^1$ | ⋯ | $x_M{}^1$ |
| $y^2$ | $x_1{}^2$ | $x_2{}^2$ | ⋯ | $x_m{}^2$ | ⋯ | $x_M{}^2$ |
| ⋮ | ⋮ | ⋮ | | ⋮ | | ⋮ |
| $y^n$ | $x_1{}^n$ | $x_2{}^n$ | ⋯ | $x_m{}^n$ | ⋯ | $x_M{}^n$ |
| ⋮ | ⋮ | ⋮ | | ⋮ | | ⋮ |
| $y^N$ | $x_1{}^N$ | $x_2{}^N$ | | $x_m{}^N$ | | $x_M{}^N$ |

QUALITY ABNORMALITY ANALYSIS METHOD, METHOD OF MANUFACTURING METAL MATERIAL, AND QUALITY ABNORMALITY ANALYSIS DEVICE

FIELD

The present invention relates to a quality abnormality analysis method, a method of manufacturing a metal material, and a quality abnormality analysis device.

BACKGROUND

As a method of predicting quality for any requested conditions, for example, Patent Literatures 1 to 8 disclose the following method. In this method, for example, a distance between a plurality of past observation conditions stored in a result database and desired requested conditions is calculated, a weight of observation data (result data) is calculated from the calculated distance, and a function for fitting the vicinity of the requested conditions is created from the calculated weight. Then, the quality for the requested conditions is predicted using the created function.

CITATION LIST

Patent Literature

Patent Literature 1: JP 2004-355189 A
Patent Literature 2: JP 2006-309709 A
Patent Literature 3: JP 2008-112288 A
Patent Literature 4: JP 2009-230412 A
Patent Literature 5: JP 2014 013560 A
Patent Literature 6: JP 2014 071858 A
Patent Literature 7: JP 2014 071859 A
Patent Literature 8: JP 2017-120638 A

SUMMARY

Technical Problem

In the method disclosed in Patent Literatures 1 to 8, the quality for any requested conditions is calculated from the data stored in the result database. The result database stores actual values of a plurality of manufacturing conditions and actual values of the quality of metal materials manufactured under these manufacturing conditions. Patent Literatures 1 to 8 disclose a method of constructing a prediction model for predicting quality from stored result data of a plurality of manufacturing conditions. However, Patent Literatures 1 to 8 do not refer to, when a quality abnormality of a product occurs, a technique for estimating what is a cause of the abnormality.

The present invention has been made in view of the above, and an object of the present invention is to provide a quality abnormality analysis method, a method of manufacturing a metal material, and a quality abnormality analysis device that, when a quality abnormality occurs, can present candidates of a cause the quality abnormality based on a quality prediction model for predicting quality for any manufacturing conditions.

Solution to Problem

To solve the above-described problem and achieve the object, a quality abnormality analysis method according to the present invention for a product manufactured by a manufacturing process includes: a quality prediction step of predicting quality of the product by inputting manufacturing conditions to a quality prediction model generated by using a plurality of manufacturing conditions of the manufacturing process as input variables and using the quality of the product as an output variable; a quality evaluation step of calculating a quality evaluation value of an actual product manufactured by the manufacturing process; a quality prediction error calculation step of calculating, as a quality prediction error, a difference between a quality prediction value obtained as an output of the quality prediction step and the quality evaluation value; a quality contribution calculation step of calculating quality contribution degrees of the input manufacturing conditions when predicting the quality of the product using the quality prediction model; and a quality abnormality cause presentation step of presenting, based on the quality prediction error and the quality contribution degree, a manufacturing condition causing a quality abnormality of the product.

Moreover, in the above-described quality abnormality analysis method according to the present invention, the quality contribution calculation step includes calculating the quality contribution degrees based on partial regression coefficients of the quality prediction model and values of variables.

Moreover, in the above-described quality abnormality analysis method according to the present invention, the quality abnormality cause presentation step includes presenting, in time series, a temporal integral value of the quality prediction error and the quality contribution degrees of the manufacturing conditions and visualizing and presenting temporal transition of the quality prediction error and candidates of a manufacturing condition causing the quality abnormality.

Moreover, in the above-described quality abnormality analysis method according to the present invention, the quality abnormality cause presentation step includes, when the quality prediction error exceeds a predetermined value, focusing on a manufacturing condition having a large quality contribution degree, and sequentially presenting, as candidates of a manufacturing condition causing the quality abnormality, the manufacturing conditions in order from a manufacturing condition having a largest temporal integral value of the quality contribution degree.

Moreover, in the above-described quality abnormality analysis method according to the present invention, the quality prediction model is generated by using machine learning including linear regression, local regression, principal component regression, PLS regression, neural network, regression tree, random forest, and XGBoost.

Moreover, in the above-described quality abnormality analysis method according to the present invention, the quality prediction model is a quality prediction model of a metal material manufactured through one or a plurality of processes and is generated through: a first collection step of collecting manufacturing conditions of processes for each of predetermined ranges of the metal material decided in advance; a second collection step of evaluating and collecting, for each of the predetermined ranges, quality of the metal material manufactured through the processes; a storage step of storing the manufacturing conditions of the processes and the quality of the metal material manufactured under the manufacturing conditions in correlation for each of the predetermined ranges; and a quality prediction model generation step of generating, from the stored manufacturing conditions for each of the predetermined ranges in the process, the quality prediction model for predicting the quality of each of the predetermined ranges of the metal material.

To solve the above-described problem and achieve the object, a method of manufacturing a metal material manufactured through a plurality of manufacturing processes according to the present invention includes: predicting, at stage when any manufacturing process before implementing a final manufacturing process ends, quality of a final product with the quality prediction model generated by the quality abnormality analysis method; and selecting, based on a result of the prediction, a manufacturing condition of a subsequent manufacturing process, the manufacturing condition having a high quality contribution degree and being changeable, and determining and operating the selected manufacturing condition such that the quality of the final product falls within preset quality control over the entire length.

To solve the above-described problem and achieve the object, a quality abnormality analysis device according to the present invention for a product manufactured by a manufacturing process includes: a quality prediction unit configured to predict quality of the product by inputting manufacturing conditions to a quality prediction model generated by using a plurality of manufacturing conditions of the manufacturing process as input variables and using the quality of the product as an output variable; a quality evaluation unit configured to calculate a quality evaluation value of an actual product manufactured by the manufacturing process; a quality prediction error calculation unit configured to calculate, as a quality prediction error, a difference between a quality prediction value obtained as an output of the quality prediction unit and the quality evaluation value; a quality contribution calculation unit configured to calculate quality contribution degrees of the input manufacturing conditions when predicting the quality of the product using the quality prediction model; and a quality abnormality cause presentation unit configured to present, based on the quality prediction error and the quality contribution degree, a manufacturing condition causing a quality abnormality of the product.

Advantageous Effects of Invention

According to the present invention, it is possible to present candidates of a cause of quality abnormality by calculating a quality prediction error and quality contribution degrees of manufacturing conditions using manufacturing conditions of processes and a quality prediction model for predicting the quality of a product manufactured under the manufacturing conditions. According to the present invention, it is possible to manufacture a metal material having satisfactory product quality over the entire length of a product.

BRIEF DESCRIPTION OF DRAWINGS

FIG. 3 is a diagram illustrating an example of result data collected by a manufacturing result collection unit 11 in the quality prediction model generation method according to the embodiment of the present invention.

FIG. 7 is a diagram illustrating an example of result data edited by an integrated process result editing unit in the quality prediction model generation method according to the embodiment of the present invention.

DESCRIPTION OF EMBODIMENTS

A quality prediction model generation method, a quality prediction model, a quality prediction method, a method of manufacturing a metal material, a quality prediction model generation device, a quality prediction device, a quality abnormality analysis method, a method of manufacturing a metal material, and a quality abnormality analysis device according to an embodiment of the present invention are explained with reference to the drawings.

(Quality Prediction Device/Quality Prediction Model Generation Device)

Configurations of a quality prediction device and a quality prediction model generation device according to the present embodiment are described with reference to FIG. 1. The quality prediction device is a device for predicting the quality of a metal material manufactured through one or a plurality of processes. Note that examples of the metal material in the present embodiment include steel products including a semi-finished products such as a slab and a product such as a steel plate manufactured by rolling the slab.

Specifically, a quality prediction device 1 is realized by a general-purpose information processing device such as a personal computer or a workstation. The quality prediction device 1 includes, as main components, for example, a processor configured by a CPU (Central Processing Unit) or the like and a memory (a main storage unit) configured by a RAM (Random Access Memory), a ROM (Read Only Memory), and the like.

Figure 1:
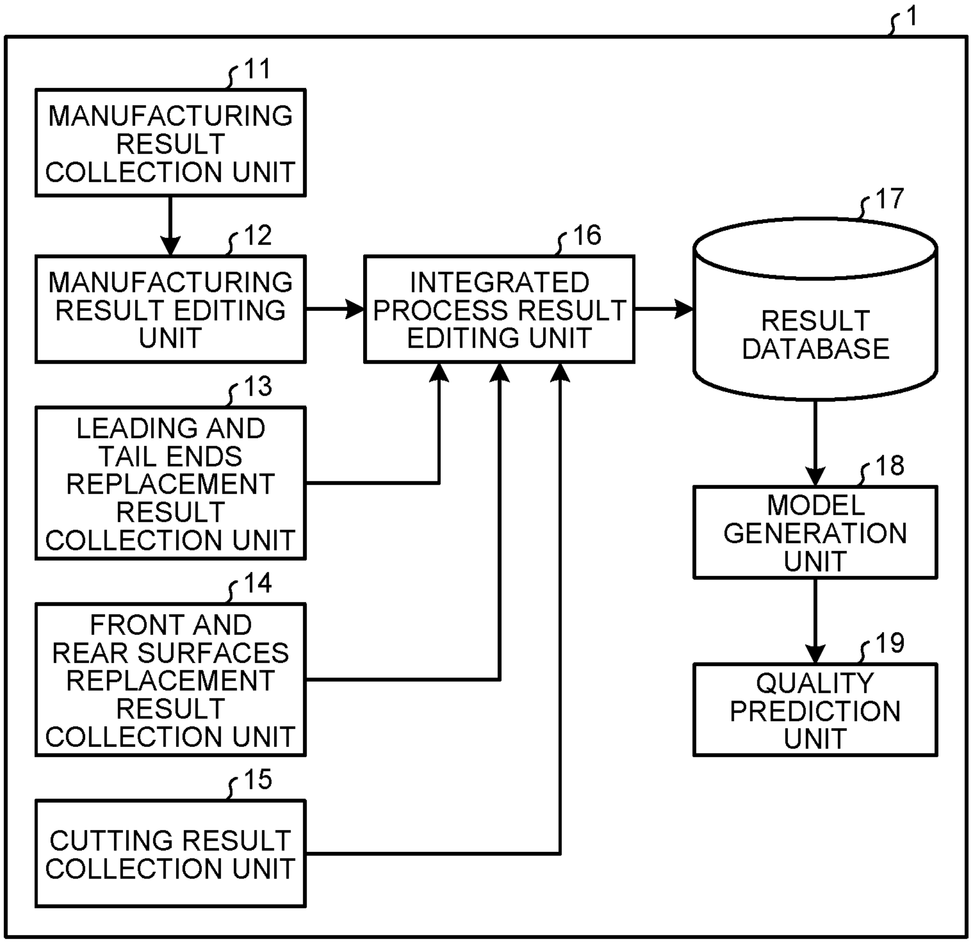
FIG. 1 is a block diagram illustrating configurations of a quality prediction model generation device and a quality prediction device according to an embodiment of the present invention.

As illustrated in FIG. 1, the quality prediction device 1 includes a manufacturing result collection unit 11, a manufacturing result editing unit 12, a leading and tail ends replacement result collection unit 13, a front and rear surfaces replacement result collection unit 14, and a cutting result collection unit 15. In addition, the quality prediction device 1 includes an integrated process result editing unit 16, a result database 17, a model generation unit 18, and a quality prediction unit 19. Note that the quality prediction model generation device according to the present embodiment is configured by elements excluding the quality prediction unit 19 in the quality prediction device 1. In the following explanation, the quality prediction model generation device is also explained in the explanation of the quality prediction device 1.

A not-illustrated sensor is connected to the manufacturing result collection unit 11. The manufacturing result collection unit 11 collects manufacturing results of processes according to a measurement period of the sensor and outputs the manufacturing results to the integrated process result editing unit 16. The "manufacturing result" described above includes manufacturing conditions of the processes and the quality of a metal material manufactured through the processes. The "manufacturing conditions" described above include a component, temperature, pressure, plate thickness, plate passing speed, and the like of the metal material in the processes. The "quality of the metal material" described above includes tensile strength and a defect mixing rate (the number of defects appearing per unit length).

Note that the manufacturing conditions of the processes collected by the manufacturing result collection unit 11 include not only actual values of the manufacturing conditions measured by the sensor but also setting values of the manufacturing conditions set in advance. That is, since a sensor is sometimes not installed depending on a process, in such a case, a setting value is collected as a manufacturing result instead of an actual value.

Figure 2:
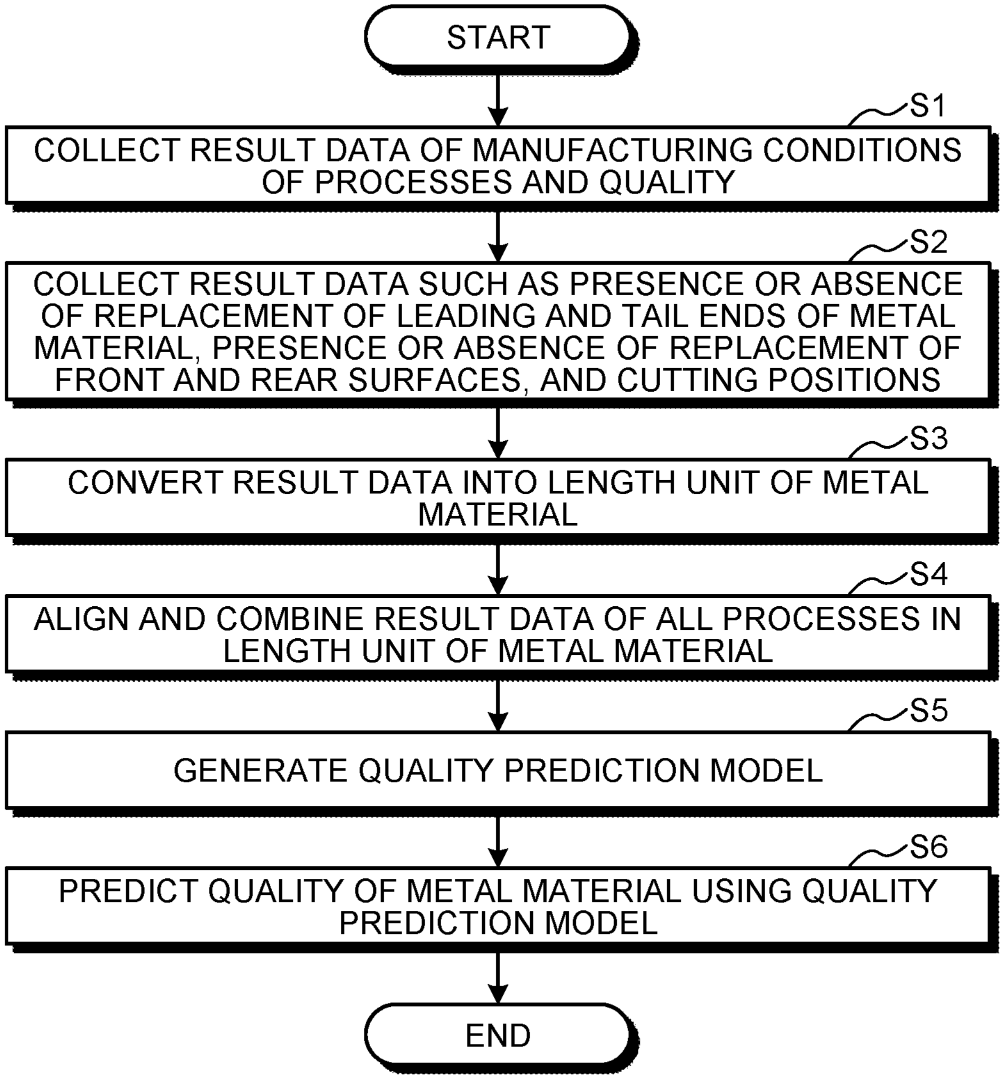
FIG. 2 is a flowchart illustrating a flow of a quality prediction model generation method and a quality prediction method according to the embodiment of the present invention.

The manufacturing result collection unit 11 collects the manufacturing conditions of the processes for each of predetermined ranges of the metal material determined in advance. The manufacturing result collection unit 11 evaluates and collects, for each of the predetermined ranges, the quality of the metal material manufactured through the processes. Note that the "predetermined range" described above indicates a fixed range in the longitudinal direction of the metal material, for example, when the metal material is a slab or a steel plate. This predetermined range is determined based on a moving distance (plate passing speed) of the metal material according to a conveyance direction in the processes. Specific processing content by the manufacturing result collection unit 11 is explained below (see FIG. 2).

Here, in the configuration illustrated in FIG. 1, only one manufacturing result collection unit 11 is provided and it is assumed that data of a manufacturing result of the processes (hereinafter referred to as "result data") is collected by the one manufacturing result collection unit 11. However, for example, a plurality of manufacturing result collection units 11 may be provided according to the number of processes and result data of the processes may be respectively collected by the separate manufacturing result collection units 11.

The manufacturing result editing unit 12 edits the result data of the processes input from the manufacturing result collection unit 11. That is, the manufacturing result editing unit 12 edits result data collected in a time unit by the manufacturing result collection unit 11 into result data in a length unit of the metal material and outputs the result data to the integrated process result editing unit 16. Specific processing content by the manufacturing result editing unit 12 is explained below (see FIG. 2).

A not-illustrated material charging machine for charging a metal material in the processes is connected to the leading and tail ends replacement result collection unit 13. The leading and tail ends replacement result collection unit 13 collects, for each of metal materials, result data about whether the leading and tail ends of the metal material have been replaced (reversed) when the metal material is charged from a preceding process to a following process through the material charging machine. Then, the leading and tail ends replacement result collection unit 13 outputs result data concerning presence or absence of replacement of the leading and tail ends of the metal material to the integrated process result editing unit 16.

The material charging machine explained above is connected to the front and rear surfaces replacement result collection unit 14. The front and rear surfaces replacement result collection unit 14 collects, for each the metal materials, result data about whether the front and rear surfaces of the metal material have been replaced (reversed) when the metal material is charged from the preceding process to the following process through the material charging machine. Then, the front and rear surfaces replacement result collection unit 14 outputs result data concerning presence or absence of replacement of the front and rear surfaces of the metal material to the integrated process result editing unit 16.

A not-illustrated cutting machine for cutting the leading end portion and the tail end portion of the metal material is connected to the cutting result collection unit 15. The cutting result collection unit 15 collects result data such as a cutting position of the metal material (a distance from the leading end of the metal material at the time of cutting) and the number of times of cutting (hereinafter referred to as a "cutting position and the like") for each of the metal materials through the cutting machine. Then, the cutting result collection unit 15 outputs the result data concerning the cutting position and the like of the metal material to the integrated process result editing unit 16.

Note that only one leading and tail ends replacement result collection unit 13, one front and rear surfaces replacement result collection unit 14, and one cutting result collection unit 15 may be provided like the manufacturing result collection unit 11 explained above or a plurality of the units may be provided according to the number of processes.

The integrated process result editing unit 16 edits the result data input from the manufacturing result editing unit 12, the leading and tail ends replacement result collection unit 13, the front and rear surfaces replacement result collection unit 14, and the cutting result collection unit 15. The integrated process result editing unit 16 stores manufacturing conditions of processes and the quality of a metal material manufactured under the manufacturing conditions in the result database 17 in correlation for each of predetermined ranges.

The integrated process result editing unit 16 specifies a predetermined range considering presence or absence of replacement of the leading and tail ends of the metal material in the processes, presence or absence of replacement of the front and rear surfaces, and a cutting position. Then, the integrated process result editing unit 16 stores the manufacturing conditions of the processes and the quality of the metal material manufactured under the manufacturing conditions in the result database 17 in a form in which the presence or absence of replacement of the leading and tail ends of the metal material in the processes, the presence or absence of replacement of the front and rear surfaces, and the cutting position can be distinguished. The integrated process result editing unit 16 stores the manufacturing conditions of the processes and the quality of the metal material manufactured under the manufacturing conditions in the result database 17 in correlation for each of the predetermined ranges.

More, for example, when the processes are rolling processes and the shape of the metal material is deformed through the processes, the integrated process result editing unit 16 evaluates the volume from the leading end of the metal material and specifies the predetermined range. Then, the manufacturing conditions of the processes and the quality of the metal material manufactured under the manufacturing conditions are stored in the result database 17 in correlation for each of the predetermined ranges. In the result database 17, the result data edited by the integrated process result editing unit 16 is accumulated.

The model generation unit 18 generates a quality prediction model for predicting quality for each of the predetermined ranges of the metal material from the manufacturing conditions for each of the predetermined ranges in the processes stored in the result database 17. The model generation unit 18 uses, for example, XGBoost as a machine learning method. Note that, as the machine learning method, besides, various methods such as linear regression, local regression, principal component regression, PLS regression, neural network, regression tree, and random forest can be used.

The quality prediction unit 19 predicts the quality of the metal material manufactured under any manufacturing conditions for each of the predetermined ranges using a quality prediction model generated by the model generation unit 18. For example, when a metal material to be predicted is a slab, the quality of the entire slab is predicted by the method of the related art. However, in the present embodiment, the quality of a predetermined range in the length direction of the slab can be predicted.

(Quality Prediction Method/Quality Prediction Model Generation Method)

A quality prediction method and a quality prediction model generation method according to the present embodiment are explained with reference to FIG. 2 to FIG. 7. The quality prediction method according to the present embodiment performs processing in step S1 to step S6 illustrated in FIG. 2. The quality prediction model generation method according to the present embodiment performs the processing in step S1 to step S5 excluding step S6 illustrated in the figure.

First, the manufacturing result collection unit 11 collects result data concerning manufacturing conditions of processes and quality (step S1). The manufacturing result collection unit 11 collects result data of manufacturing conditions of the processes and quality for each of metal materials and for each of the processes.

The result data collected by the manufacturing result collection unit 11 is, for example, as illustrated in a table of FIG. 3, data in which actual values (or setting values) of a plurality of manufacturing conditions are arranged for each of times. The result data illustrated in the figure includes items including time $t^1$, $t^2$ . . . , speeds (plate passing speeds) $v^1$, $v^2$ . . . of the metal material at the times, and a plurality of manufacturing conditions $x_1^{\ 1}$, $x_1^{\ 2}$ . . . , $x_2^{\ 1}$, $x_2^{\ 2}$ . . . measured by the sensor at the times. Note that, result data collected in a final process among the plurality of processes includes an item concerning the quality of the metal material in addition to the items illustrated in the figure.

Subsequently, the leading and tail ends replacement result collection unit 13, the front and rear surfaces replacement result collection unit 14, and the cutting result collection unit 15 collect result data (step S2). The result data is result data concerning presence or absence of replacement of the leading and tail ends of the metal material in the processes, presence or absence of replacement of the front and rear surfaces of the metal material in the processes, cutting positions of the metal material in the processes, and the like.

Figures 4, 5:
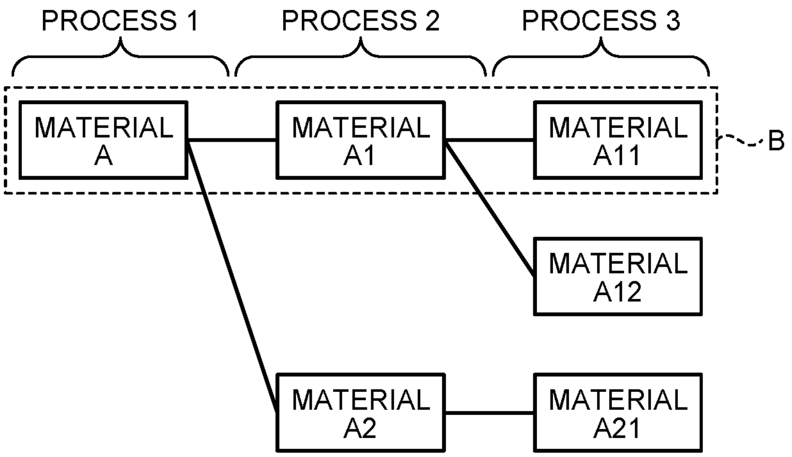
FIG. 4 is a diagram illustrating an example of result data edited by a manufacturing result editing unit 12 in the quality prediction model generation method according to the embodiment of the present invention.
FIG. 5 is a diagram illustrating an example of a case in which a metal material is manufactured through a plurality of processes in the quality prediction model generation method according to the embodiment of the present invention.

Subsequently, the manufacturing result editing unit 12 converts the result data collected by the manufacturing result collection unit 11 into a length unit of the metal material (step S3). That is, the manufacturing result editing unit 12 converts the result data collected in the time unit illustrated in FIG. 3 into the result data in the length unit of the metal material illustrated in FIG. 4. In the following explanation, a method of converting the result data in FIG. 3 into the result data in FIG. 4 is explained.

First, the manufacturing result editing unit 12 calculates positions of the metal material at times in FIG. 3 using a characteristic that time and speed (plate passing speed) multiplied together equals a distance. Subsequently, the manufacturing result editing unit 12 detects the leading and tail ends of the metal material using a characteristic that result data is calculated when the metal material is passing through the sensor installed in the processes and a missing value is calculated when the metal material is not passing. Subsequently, the manufacturing result editing unit 12 creates result data corresponding to positions from the leading end to the tail end of the metal material except when the metal material is not passing through the sensor.

Then, although the result data is data in the length unit of the metal material as it is, the result data is not data in a fixed cycle. Therefore, for example, linear interpolation or the like is performed to convert the result data into result data in the length unit of the metal material and in a fixed cycle. That is, in the processes, when the plate passing speed of the metal material is low, result data that can be collected becomes fine and, when the plate passing speed of the metal material is high, result data that can be collected becomes coarse. Therefore, the interpolation explained above is performed to align the roughness of the result data. The manufacturing result editing unit 12 creates result data in the length unit of the metal material illustrated in FIG. 4 by performing the processing explained above.

Subsequently, the integrated process result editing unit 16 aligns and combines the result data of all the processes in the length unit of the metal material (step S4). The integrated process result editing unit 16 combines the result data based on the result data in the length unit of metal material and result data concerning presence or absence of replacement of the leading and tail ends of the metal material, presence or absence of replacement of the front and rear surfaces of the metal material, a cutting position of the metal material, and the like. That is, based on the result data explained above, the integrated process result editing unit 16 aligns and combines a plurality of manufacturing conditions and the quality of the metal material in all the processes in the length unit of the metal material on the exit side of the final process. Note that the result data in the length unit of the metal material is created by the manufacturing result editing unit 12. The result data concerning the presence or absence of replacement of the leading and tail ends of the metal material is collected by the leading and tail ends replacement result collection unit 13. The result data concerning the presence or absence of replacement of the front and rear surfaces of the metal material is collected by the front and rear surfaces replacement result collection unit 14. The result data concerning the cutting position and the like of the metal material is collected by the cutting result collection unit 15.

In this way, the integrated process result editing unit 16 correlates the manufacturing conditions of the processes and the quality of the metal material manufactured under this manufacturing conditions for each predetermined range in the length direction of the metal material and stores the manufacturing conditions and the quality of the metal material in the result database 17. In the following explanation, an example of processing performed by the integrated process result editing unit 16 is explained.

For example, as illustrated in FIG. 5, a case is conceived in which a metal material (a material) is manufactured through a process 1, a process 2, and a process 3. The process 1 to the process 3 are, for example, rolling processes. The length in the longitudinal direction of the material increases through each of the processes. As illustrated in the figure, a material A is divided into a material A1 and a material A2 when the processing shifts from the process 1 to the process 2 and the material A1 is divided into a material A11 and a material A12 when the processing shifts from the process 2 to the process 3.

Figure 6:
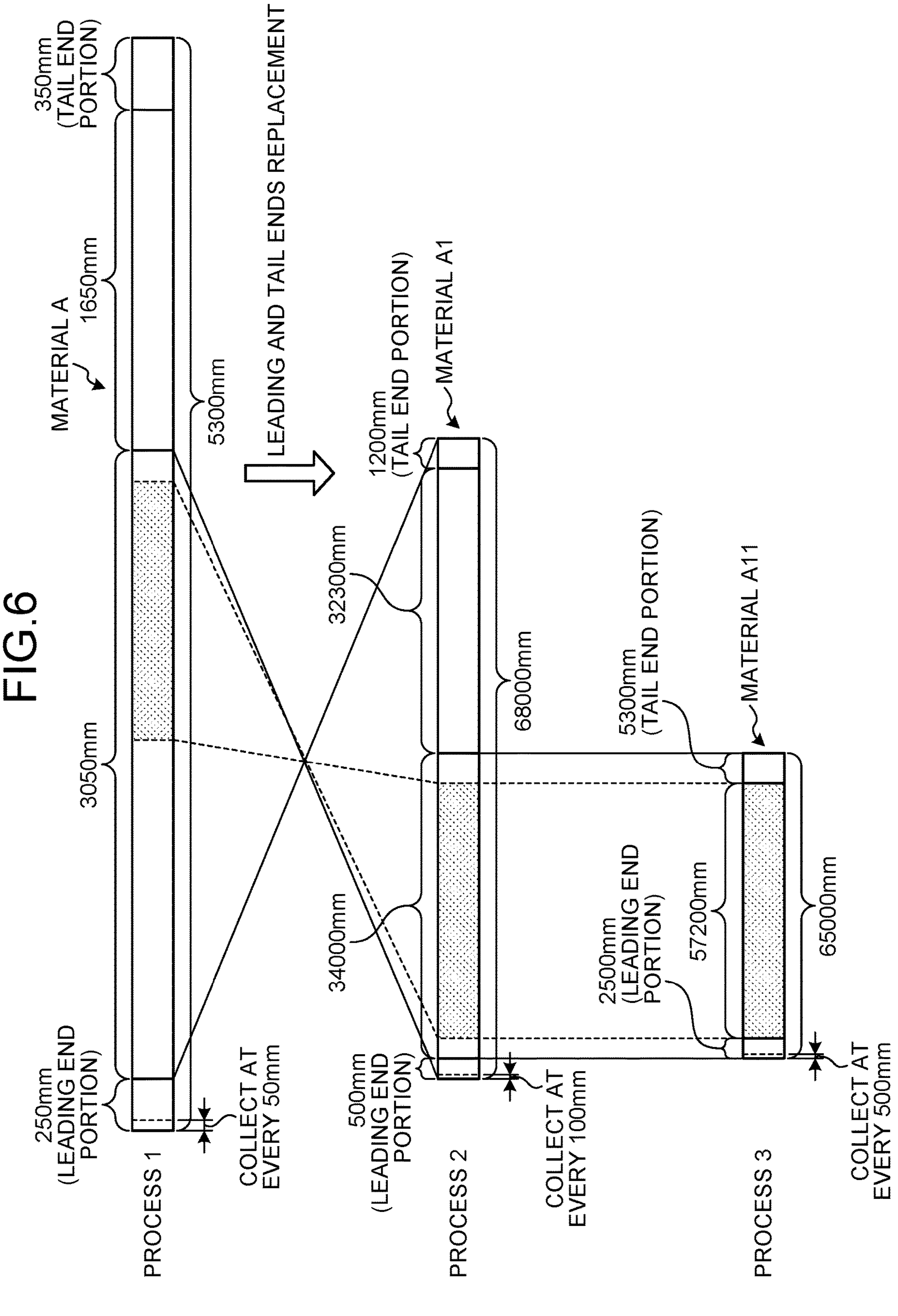
FIG. 6 is a diagram illustrating an example of the metal material in the processes in the quality prediction model generation method according to the embodiment of the present invention.

FIG. 6 illustrates an image of the materials in the processes and is a diagram focusing on a B part in FIG. 5. For example, for the material A in the process 1, result data of M1 items of, for example, $X_1^1$ to $X_1^{M1}$ is collected by the manufacturing result collection unit 11 at every 50 mm in a range of length of 5300 mm from the leading end to the tail end. For the material A, the following result data is collected by the cutting result collection unit 15. That is, result data is collected in which a leading end portion of 0 mm (a leading end) to 250 mm is cut off, the material A1 is taken at 250 mm to 3300 mm, the material A2 is taken at 3300 mm to 4950 mm, and a tail end portion of 4950 mm to 5300 mm (a tail end) is cut off.

Subsequently, for the material A1 in the process 2, result data "with replacement of the leading and tail ends" is collected by the leading and tail ends replacement result collection unit 13. For the material A1, result data of M2 items of, for example, $X_2^1$ to $X_2^{M2}$ is collected by the manufacturing result collection unit 11 at every 100 mm in a range of length of 68000 mm from the leading end to the tail end. For the material A1, the following result data is collected by the cutting result collection unit 15. That is, result data is collected in which a leading end portion of 0 mm (a leading end) to 500 mm is cut off, the material A11 is taken at 500 mm to 34500 mm, the material A12 is taken at 34500 mm to 66800 mm, and a tail end portion of 66800 mm to 68000 mm (a tail end) is cut off.

For the material A11 in the process 3, result data "without replacement of the leading and tail ends" is collected by the leading and tail ends replacement result collection unit 13. For the material A11, result data of M3 items of, for example, $X_3^1$ to $X_3^{M3}$ is collected by the manufacturing result collection unit 11 at every 500 mm in a range of length of 65000 mm from the leading end to the tail end. For the material A11, result data in which a leading end portion of 0 mm (a leading end) to 2500 mm is cut off, the material A11 is taken at 2500 mm to 59700 mm, and a tail end portion of 59700 mm to 65000 mm (a tail end) is cut off is collected by the cutting result collection unit 15.

The integrated process result editing unit 16 processes the record data of all the processes finely collected in the longitudinal direction by a not-illustrated sensor while considering result data such as presence or absence of replacement of the leading and tail ends of the metal material, presence or absence of replacement of the front and rear surfaces, and cutting positions in the processes. That is, in order to couple the result data in all the processes in the length unit of the metal material in the final process, as illustrated in FIG. 6, material lengths in the process 2 and the process 1 are scaled according to material length of the process 3, which is the final process, (see a broken line in the figure).

Then, the integrated process result editing unit 16 specifies positions where the metal materials are taken considering the leading end portions and the tail end portions cut off in the processes. Then, in predetermined ranges of the metal material in the final process, the quality of the predetermined ranges and the manufacturing conditions of all the processes in the predetermined ranges are correlated and stored in the result database 17. For example, in FIG. 6, a shaded portion where the material A11 is taken in the process 3, which is the final process, is identified by tracing back to the material A1 in the process 2 and the material A in the process 1. By repeatedly performing such processing for all the metal materials, as illustrated in FIG. 7, result data obtained by aligning and combining result data of a plurality of manufacturing conditions (and quality) of the metal materials in all the processes in the length unit of the metal materials is created. Referring back to FIG. 2, the explanation is continued below.

The model generation unit 18 generates a quality prediction model for predicting the quality of the metal material from the manufacturing conditions in the processes (step S4). Subsequently, the quality prediction unit 19 predicts, for each of the predetermined ranges, the quality of the metal material to be manufactured under any manufacturing conditions using the quality prediction model generated by the model generation unit 18 (step S5).

With the quality prediction model generation method, the quality prediction model, the quality prediction method, the quality prediction model generation device, and the quality prediction device according to the present embodiment explained above, the following effects are achieved. That is, by generating the quality prediction model in which the manufacturing conditions of the processes and the quality of the metal material manufactured under the manufacturing conditions are associated for each of the predetermined ranges, the quality of the metal material for any manufacturing conditions can be predicted with higher accuracy than in the related art.

With the quality prediction model generation method, the quality prediction model, the quality prediction method, the quality prediction model generation device, and the quality prediction device according to the present embodiment, the following effects are achieved. That is, the result data of the plurality of manufacturing conditions (and quality) of all the processes are aligned and combined in the length unit of the metal material on the exit side of the final process considering replacement of the leading and tail ends, replacement of the front and rear surfaces, cutting positions, and the like in the processes. Therefore, since the quality is predicted by effectively utilizing the result data of the manufacturing conditions finely collected in the longitudinal direction of the metal material by the sensor, the quality can be predicted with higher accuracy than in the related art.

Note that, when the quality prediction method according to the present embodiment is applied to a method of manufacturing a metal material, for example, the following processing is performed. First, after manufacturing conditions decided halfway in manufacturing the metal material are fixed, the quality of the metal material manufactured under the fixed manufacturing conditions is predicted for each of predetermined ranges by the quality prediction method according to the present embodiment. Then, the manufacturing conditions of the subsequent processes are changed based on a result of the prediction. The manufacturing conditions are changed such that the quality for each of all the predetermined ranges included over the entire length of the metal material to be manufactured falls within a predetermined control range. By applying the quality prediction method according to the present embodiment to the method of manufacturing a metal material in this way, the final quality of the metal material can be predicted at a stage halfway in the manufacturing. The manufacturing conditions can be changed according to the prediction. Therefore, the quality of the metal material to be manufactured is improved.

(Quality Abnormality Analysis Device)

A configuration of the quality abnormality analysis device according to the present embodiment is explained with reference to FIG. 8. The quality abnormality analysis device is a device for analyzing a cause of a quality abnormality of a product manufactured by a manufacturing process. Note that examples of the product in the present embodiment include a steel product including a semi-product such as a slab and a product such as a steel plate manufactured by rolling the slab.

Specifically, a quality abnormality analysis device 2 is implemented by a general-purpose information processing device such as a personal computer or a workstation and includes, as main components, for example, a processor configured by a CPU or the like and a memory (a main storage unit) configured by a RAM, a ROM, and the like.

Figure 8:
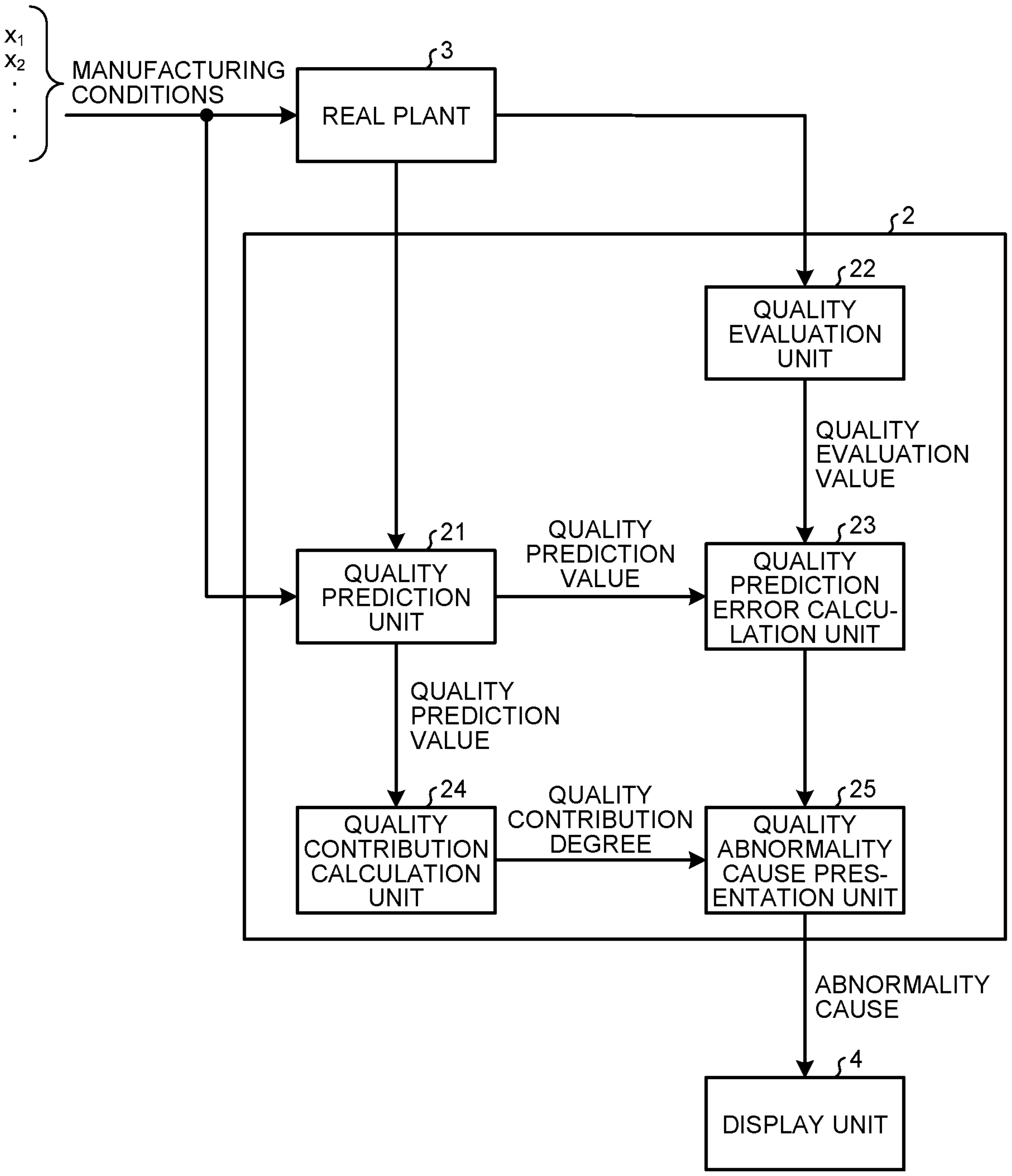
FIG. 8 is a block diagram illustrating a configuration of a quality abnormality analysis device according to the embodiment of the present invention.

As illustrated in FIG. 8, the quality abnormality analysis device 2 includes a quality prediction unit 21, a quality evaluation unit 22, a quality prediction error calculation unit 23, a quality contribution calculation unit 24, and a quality abnormality cause presentation unit 25.

The quality prediction unit 21 inputs any manufacturing conditions to a quality prediction model generated in advance using a plurality of manufacturing conditions of the manufacturing process collected from a real plant 3 as input variables and using the quality of a product as an output variable to thereby predict the quality of the product. The quality prediction unit 21 outputs a quality prediction value as a result of the quality prediction.

The quality prediction model used in the quality prediction unit 21 is generated by using machine learning including, for example, linear regression, local regression, principal component regression, PLS regression, neural network, regression tree, random forest, and XGBoost. The quality prediction model may be a model generated by the quality prediction model generation method (see FIG. 2) according to the embodiment explained above.

In this case, the quality prediction model is a quality prediction model of a metal material manufactured through one or a plurality of processes and is generated through a first collection step, a second collection step, a storage step, and a quality prediction model generation step.

In the first collection step, the manufacturing result collection unit 11 (see FIG. 1) collects manufacturing conditions of processes for each of predetermined ranges of the metal material determined in advance. In the second collection step, the manufacturing result collection unit 11 (see the figure) evaluates and collects, for each of the predetermined ranges, the quality of the metal material manufactured through the processes. In the storage step, the integrated process result editing unit 16 (see the figure) stores the manufacturing conditions of the processes and the quality of the metal material manufactured under the manufacturing conditions in correlation for each of the predetermined ranges. In the quality prediction model generation step, the model generation unit 18 (see the figure) generates a quality prediction model for predicting the quality of the metal material from the stored manufacturing conditions in the processes.

The quality evaluation unit 22 calculates a quality evaluation value of an actual product manufactured by the manufacturing process. Examples of the quality evaluation value include the strength of a cold-rolled thin steel sheet. Specifically, the quality evaluation unit 22 is configured by a measuring instrument, a material testing device, and the like.

The quality prediction error calculation unit 23 calculates, as a quality prediction error, a difference between the quality prediction value obtained as the output of the quality prediction unit 21 and the quality evaluation value obtained as the output of the quality evaluation unit 22. Every time the quality prediction unit 21 performs quality prediction using the quality prediction model, the quality prediction error calculation unit 23 sequentially evaluates an error between the actual quality evaluation value calculated by the quality evaluation unit 22 and the quality prediction value.

The quality contribution calculation unit 24 calculates a quality contribution degree of the input manufacturing conditions when predicting the quality of the product using the quality prediction model. The quality abnormality cause presentation unit 25 presents, based on the quality prediction error and the quality contribution degree, manufacturing conditions causing a quality abnormality of the product on a display unit 4. The display unit 4 is output means of data processed by the quality abnormality analysis device 2 and is configured by, for example, an LCD (liquid crystal display), an OLED (organic EL display), or the like.

Here, the quality abnormality cause presentation unit 25 calculates the quality contribution degree based on partial regression coefficients of the quality prediction model and values of variables.

The quality abnormality cause presentation unit presents a temporal integral value of the quality prediction error and the quality contribution degrees of the manufacturing conditions in time series, visualizes temporal transition of the quality prediction error and candidates of the manufacturing conditions causing the quality abnormality and presents the temporal transition to the display unit 4. As explained above, by presenting the temporal transition of the quality prediction error and the candidates of the manufacturing conditions causing the quality abnormality, the manufacturing conditions estimated as the cause of the quality abnormality can be easily grasped.

When the quality prediction error exceeds a predetermined value, the quality abnormality cause presentation unit 25 focuses on a manufacturing condition having a large quality contribution degree and sequentially presents, to the display unit 4, the manufacturing conditions in order from the manufacturing condition having the largest temporal integral value of the quality contribution degree as a candidate of the manufacturing condition causing the quality abnormality. As explained above, by presenting the manufacturing conditions having large temporal integral values of the quality contribution degrees side by side, it is possible to easily grasp a manufacturing conditions estimated as a cause of a quality abnormality.

Note that contents of specific processing of the quality evaluation unit 22, the quality prediction error calculation unit 23, the quality contribution calculation unit 24, and the quality abnormality cause presentation unit 25 are explained in examples explained below.

(Quality Abnormality Analysis Method)

Figure 9:
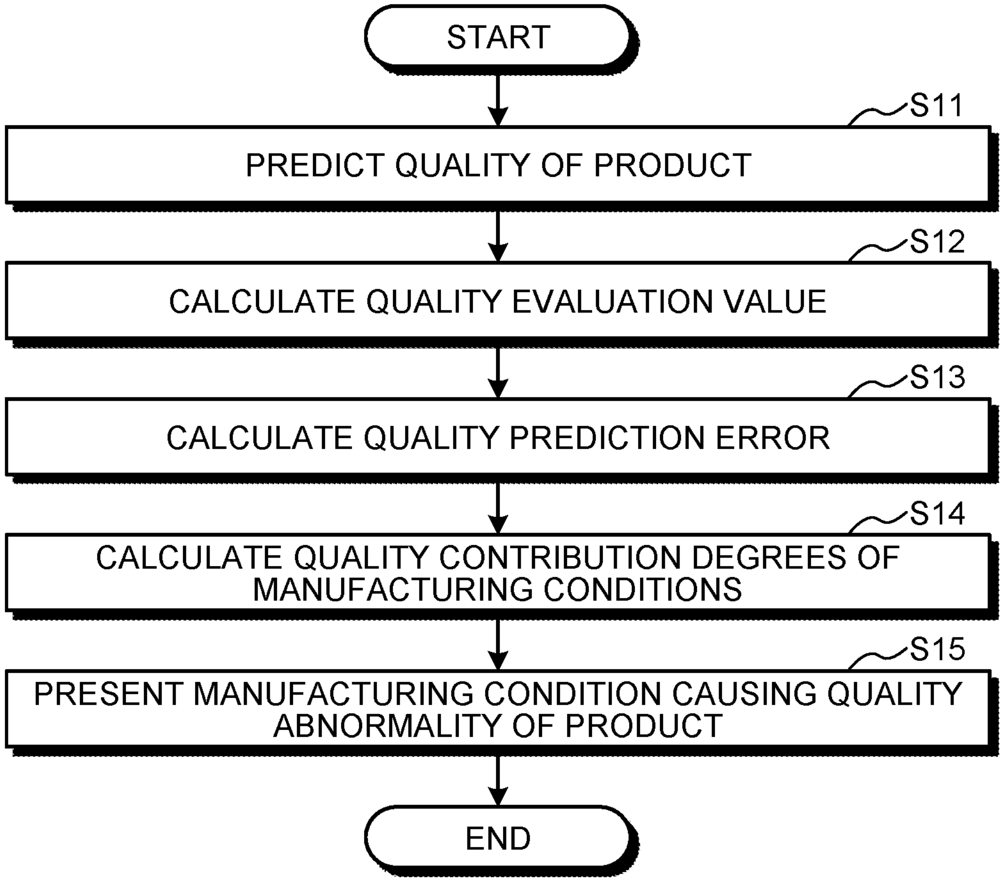
FIG. 9 is a flowchart illustrating a flow of a quality abnormality analysis method according to the embodiment of the present invention.

The quality abnormality analysis method according to the present embodiment is explained with reference to FIG. 9. The quality abnormality analysis method according to the present embodiment performs the processing of steps S11 to S15 illustrated in FIG. 9.

First, the quality prediction unit 21 predicts the quality of a product by inputting manufacturing conditions to a quality prediction model generated in advance (step S11). Subsequently, the quality evaluation unit 22 calculates a quality evaluation value of an actual product manufactured by the manufacturing process (step S12). Subsequently, the quality prediction error calculation unit 23 calculates a difference between a quality prediction value obtained in step S11 and the quality evaluation value obtained in step S12 as a quality prediction error (step S13).

Subsequently, the quality contribution calculation unit 24 calculates quality contribution degrees of the manufacturing conditions input to the quality prediction model when predicting the quality (step S14). Subsequently, the quality abnormality cause presentation unit 25 presents, based on the quality prediction error and the quality contribution degrees, manufacturing conditions causing a quality abnormality of the product to the display unit 4 (step S15).

With the quality abnormality analysis device and the quality abnormality analysis method according to the present embodiment explained above, the following effects are achieved. That is, by using the manufacturing conditions of the processes and the quality prediction model for predicting the quality of the product to be manufactured under the manufacturing conditions and calculating the quality prediction error and the quality contribution degrees of the manufacturing conditions, it is possible to present candidates of the cause of the quality abnormality.

EXAMPLES

Example 1

An example of the quality prediction method according to the present embodiment is explained. In the present example, the quality prediction method according to the present embodiment was applied to prediction of tensile strength of a high-workability high-strength cold rolled steel sheet, which is a type of cold rolled thin steel sheet.

An objective variable (quality) of quality prediction in the present example is the tensile strength of a product (the high-workability high-strength cold rolled steel sheet). Explanatory variables (manufacturing conditions) are a chemical component of the metal material in a smelting process, temperature of the metal material in a casting process, temperature of the metal material in a heating process, temperature of the metal material in a hot rolling process, and temperature of the metal material in a cooling process. Further, the explanatory variables (the manufacturing conditions) are temperature of the metal material in a cold rolling process, temperature of the metal material in an annealing process, and the like. In the present example, the manufacturing condition and the quality were predicted for one product from a result database (see (a) of FIG. 10) of the related art in which one representative value such as an average value was stored for each one product. In the present example, the manufacturing conditions and the quality were predicted for one product from a quality prediction model generated from a result database (see (b) of FIG. 10) of the quality prediction method according to the present embodiment. In the present example, results of the two predictions were compared. The number of samples of the result database was 40,000, the number of explanatory variables was forty-five, and local regression was used as a prediction method. As a result of the prediction, it was confirmed that a prediction error (see (b) of FIG. 11) by the quality prediction method according to the present embodiment can reduce a root mean square error (RMSE) by 23% compared with a prediction error (see (a) of FIG. 11) by the quality prediction method of the related art.

The quality prediction method according to the present embodiment was applied to prediction of front and rear surfaces hardness of a thick steel sheet. An objective variable is the hardness of the front and rear surfaces of a product and explanatory variables are chemical components in a refining process, front and rear surfaces temperatures in a casting process, front and rear surfaces temperatures in a heating process, front and rear surfaces temperatures in a rolling process, front and rear surfaces temperatures in a cooling process, and the like.

Figure 10:
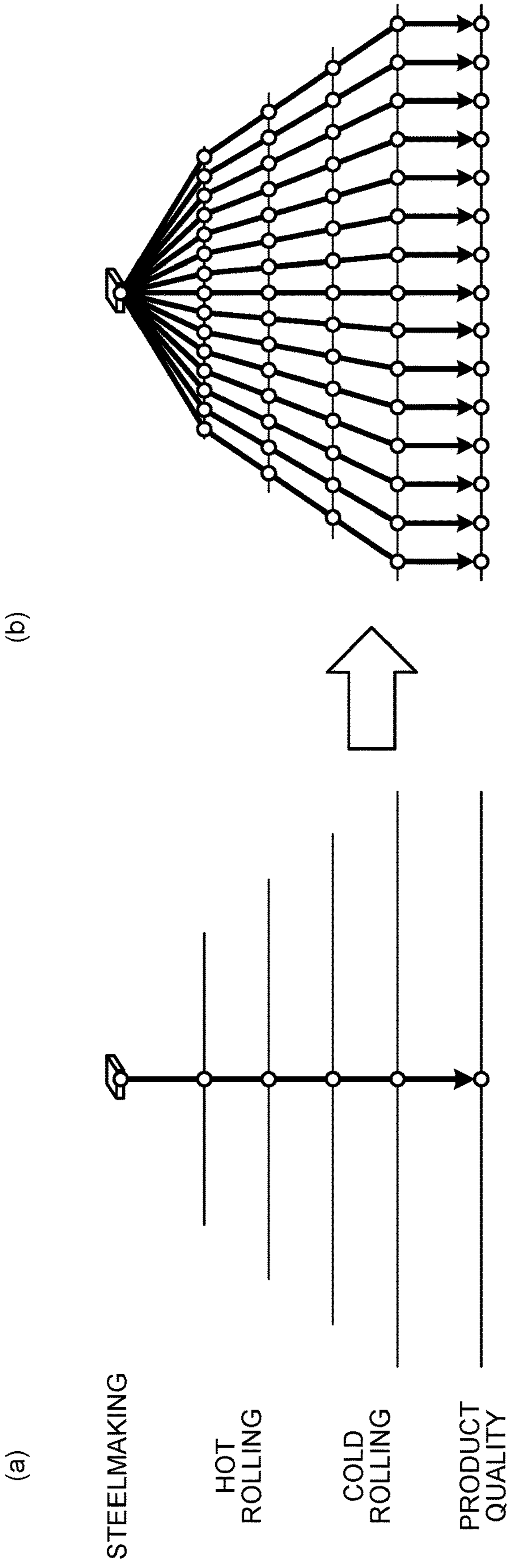
FIG. 10 is a diagram schematically illustrating configurations of result databases of the related art and the present invention.
Figure 11:
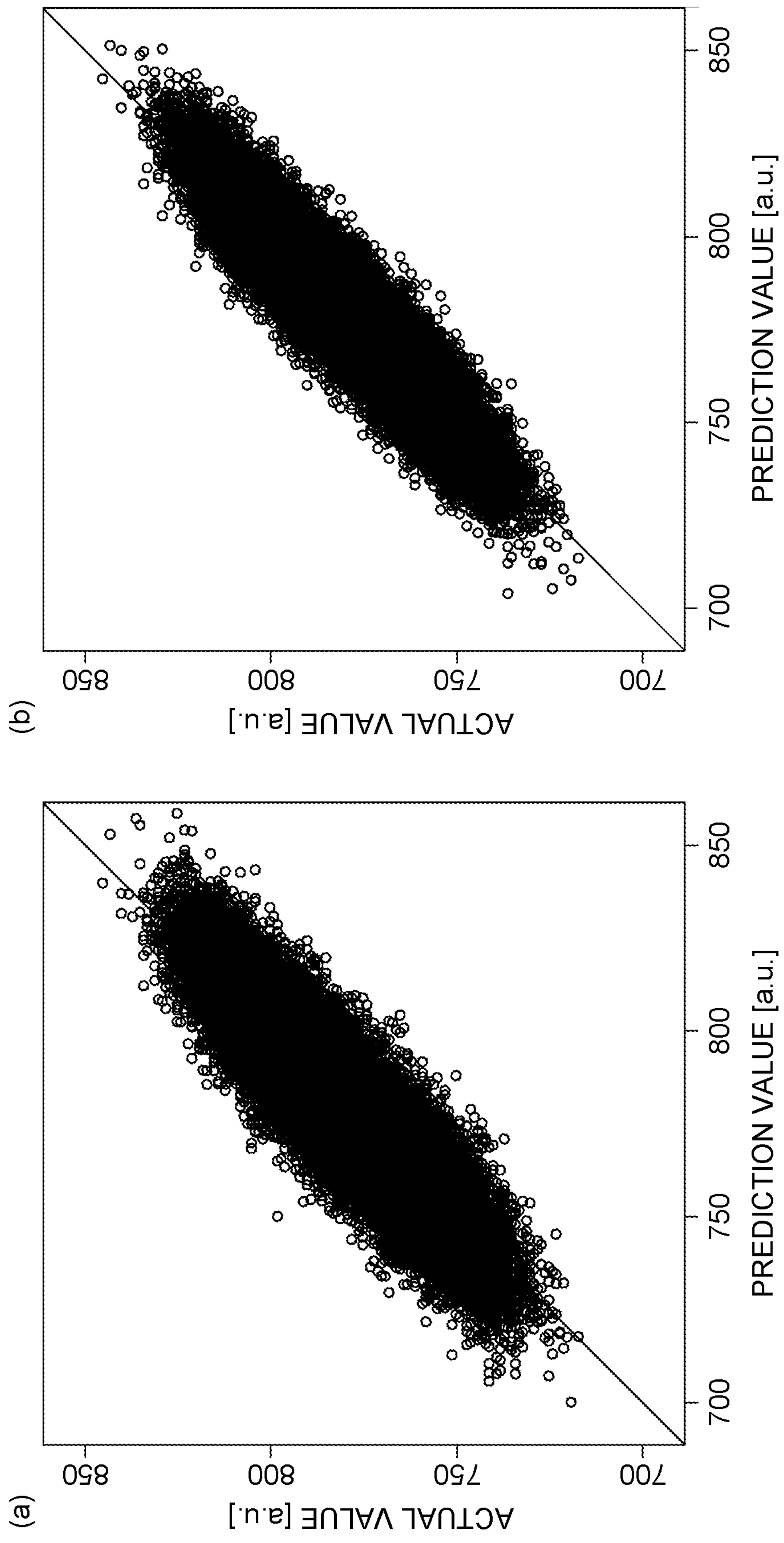
FIG. 11 is a diagram illustrating prediction errors of a method of the related art and a method of the present invention in prediction of tensile strength of a high-workability high-strength cold rolled steel sheet.
Figure 12:
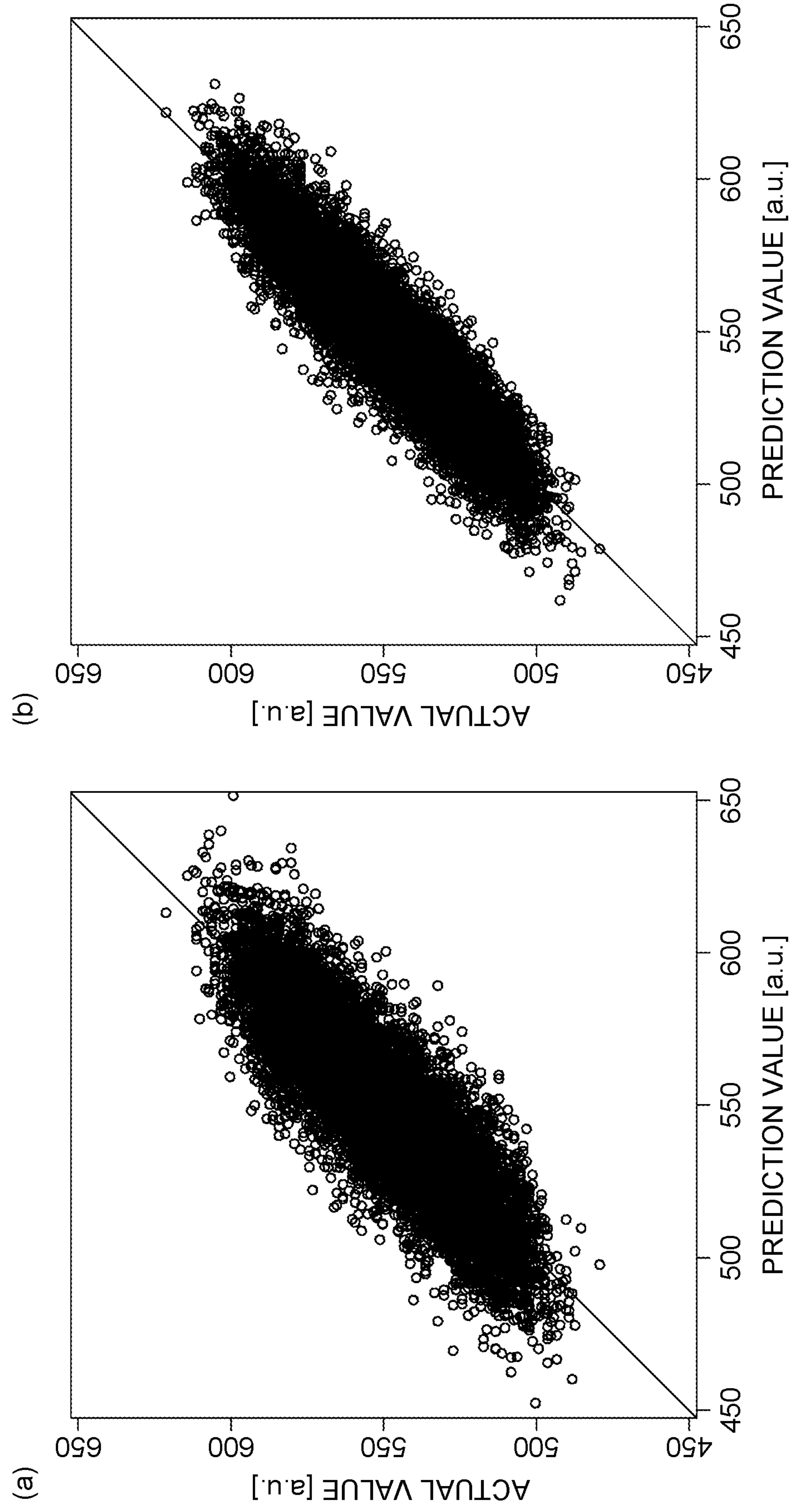
FIG. 12 is a diagram illustrating prediction errors of the method of the related art and the method of the present invention in prediction of front and rear surfaces hardness degrees of a thick steel sheet.

Manufacturing conditions and quality were predicted for one product from the result database of the related art (see (a) of FIG. 10) in which one representative value such as an average value is stored for the one product. Manufacturing conditions and quality were predicted for one product from the quality prediction model generated from the result database (see (b) of FIG. 10) of the quality prediction method according to the present embodiment. Then, results of the two predictions were compared. The number of samples of the result database was 10000, the number of explanatory variables was 30, and linear regression was used as a prediction method. As a result of the prediction, as illustrated in FIG. 12, it was confirmed that a prediction error (see (b) of FIG. 12) by the quality prediction method according to the present embodiment can reduce a root mean square error (RMSE) by 26% compared with a prediction error (see (a) of FIG. 12) by the quality prediction method of the related art.

The quality prediction method according to the present embodiment was applied to prediction of front and rear surfaces defects of a hot-dip galvanized steel sheet, which is a type of a cold-rolled thin steel sheet. An objective variable is presence or absence of a defect on the front and rear surfaces of a product. Explanatory variables are a chemical component in a refining process, front and rear surfaces temperatures in a casting process, meniscus flow velocity, a mold surface level, front and rear surfaces temperatures in a heating process, front and rear surfaces temperatures in a hot rolling process, front and rear surfaces temperatures in a cooling process, an acid concentration and an acid temperature in a pickling process, and front and rear surfaces temperatures in a cooling pressure process. Further, explanatory variables are front and rear surfaces temperatures in an annealing process, a plating adhesion amount in a plating process, a degree of alloying, and the like.

Figure 13:
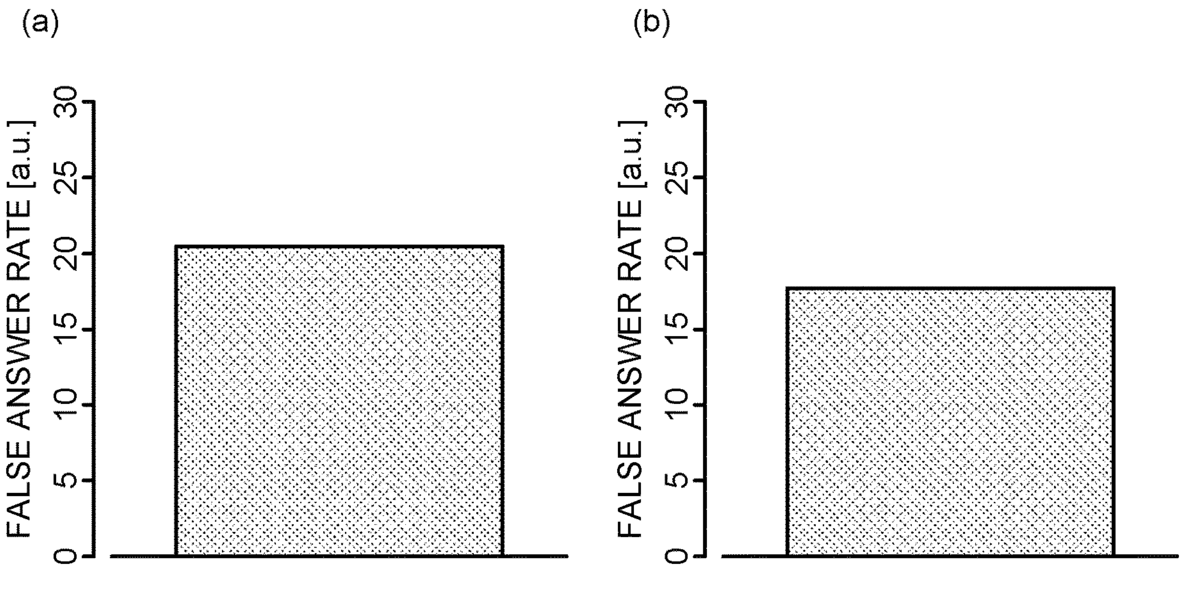
FIG. 13 is a diagram illustrating false answer rates of the method of the related art and the method of the present invention in prediction of front and rear surfaces results of a hot-dip galvanized steel sheet.

Manufacturing conditions and quality were predicted for one product from the result database of the related art (see (a) of FIG. 10) in which one representative value such as an average value is stored for the one product. Manufacturing conditions and quality were predicted for one product from the quality prediction model generated from the result database (see (b) of FIG. 10) of the quality prediction method according to the present embodiment. Then, results of the two predictions were compared. The number of samples of the result database was 4000, the number of explanatory variables was 250, and a decision tree was used as the prediction method. As a result of the prediction, as illustrated in FIG. 13, it was confirmed that a false answer rate (see (b) of FIG. 13) by the quality prediction method according to the present embodiment can be reduced by 14% compared with a false answer rate (see (a) of FIG. 13) by the quality prediction method of the related art.

The quality prediction method according to the present embodiment was applied to tensile strength prediction for a high-strength cold rolled steel sheet, which is a type of a cold rolled thin steel sheet and manufacturing conditions of subsequent processes were changed based on a result of the prediction. Here, an example is explained in which a post-annealing cooling temperature, which is a manufacturing condition at the final stage of the cold rolling process, is changed at a stage halfway in manufacturing in which actual values of manufacturing conditions before the final stage of the steelmaking process, the hot rolling process, and the cold rolling process are obtained.

Tensile strength prediction values in positions of the entire length of a product predicted using the quality prediction method according to the present embodiment based on the actual values of the manufacturing conditions before the final stage of the steelmaking process, the hot rolling process, and the cold rolling process and a reference value of the post-annealing cooling temperature, which is the manufacturing condition at the final stage of the cold rolling process, is shown as follows.

$$\hat{y}^1, \hat{y}^2, \ldots \hat{y}^L$$

When a cooling temperature after the annealing temperature changes by Δu from a reference value, an amount of change in tensile strength in positions of the entire length of the product predicted using the quality prediction method according to the present embodiment is shown as follows.

$$\Delta\hat{y}^1(\Delta u), \Delta\hat{y}^2(\Delta u), \ldots \Delta\hat{y}^L(\Delta u)$$

Based on the above, an optimization problem represented by the following Formula (1) is solved.

$$\Delta u^* = \underset{\Delta u}{\mathrm{argmin}}|\Delta u| \cdot \cdot \text{subject to} \cdot \cdot \quad (1)$$

$$y_{LL} \le \hat{y}^k + \Delta\hat{y}^k(\Delta u) \le y_{UL}, \ (k = 1, 2, \ldots, L)$$

Here, in the above formula (1), $y_{LL}$ and $y_{UL}$ are respectively a control lower limit and a control upper limit of the tensile strength and Δu* is an optimal solution of this optimization problem. This optimization problem can be solved by a mathematical programming method such as a branch and bound method. By changing a cooling temperature after an annealing temperature by Δu*, it is possible to obtain a cold rolled steel sheet in which tensile strength over the entire length does not deviate from a control range, that is, there is no quality defect over the entire length.

As explained above, the result data stored in the result database of the quality prediction method according to the present embodiment can be as follows. That is, in the predetermined ranges of the metal material in the final process, it is possible to trace and combine precise result data of hardness or presence or absence of a defect and the manufacturing conditions of all the processes while considering result data such as presence or absence of replacement of the leading and tail ends, presence or absence of replacement of the front and rear surfaces, and cutting positions. Then, since a prediction value under any manufacturing conditions is calculated based on a quality prediction model generated from the result database constructed in that way, the quality of the metal material can be predicted with high accuracy.

The quality prediction method according to the present embodiment was applied to strength prediction of a certain type of a cold-rolled thin steel sheet and manufacturing conditions of subsequent processes were changed based on a result of the prediction. Here, an example is explained in which an annealing temperature in the cold rolling process is changed at a stage halfway in manufacturing in which actual values of manufacturing conditions up to the steelmaking process and the hot rolling process are obtained.

A strength prediction value in positions of the entire length of a product predicted using the quality prediction method according to the present embodiment based on the actual values of the manufacturing conditions up to the steelmaking process and the hot rolling process and a reference value of the annealing temperature in the cold rolling process is shown as follows.

$$\hat{y}^1, \hat{y}^2, \ldots \hat{y}^L$$

When the annealing temperature changes by Au from the reference value, an amount of change in strength in positions of the entire length of the product predicted using the quality prediction method according to the present embodiment is shown as follows.

$$\Delta\hat{y}^1(\Delta u), \Delta\hat{y}^2(\Delta u), \ldots \Delta\hat{y}^L(\Delta u)$$

Based on the above, an optimization problem represented by the following Formula (1) is solved.

$$\Delta u^* = \underset{\Delta u}{\operatorname{argmin}}|\Delta u| \cdot \cdot \text{subject to} \cdot \cdot \quad (1)$$
$$y_{LL} \le \hat{y}^k + \Delta\hat{y}^k(\Delta u) \le y_{UL}, (k = 1, 2, \ldots, L)$$

Here, in the above Formula (1), $y_{LL}$ and $y_{UL}$ are respectively a control lower limit and a control upper limit of the strength and Δu* is an optimal solution of this optimization problem. This optimization problem can be solved by a mathematical programming method such as a branch and bound method. By changing the annealing temperature by Δu*, it is possible to obtain a cold rolled steel sheet in which the strength over the entire length does not deviate from the control range, that is, there is no quality defect over the entire length.

Figure 14:
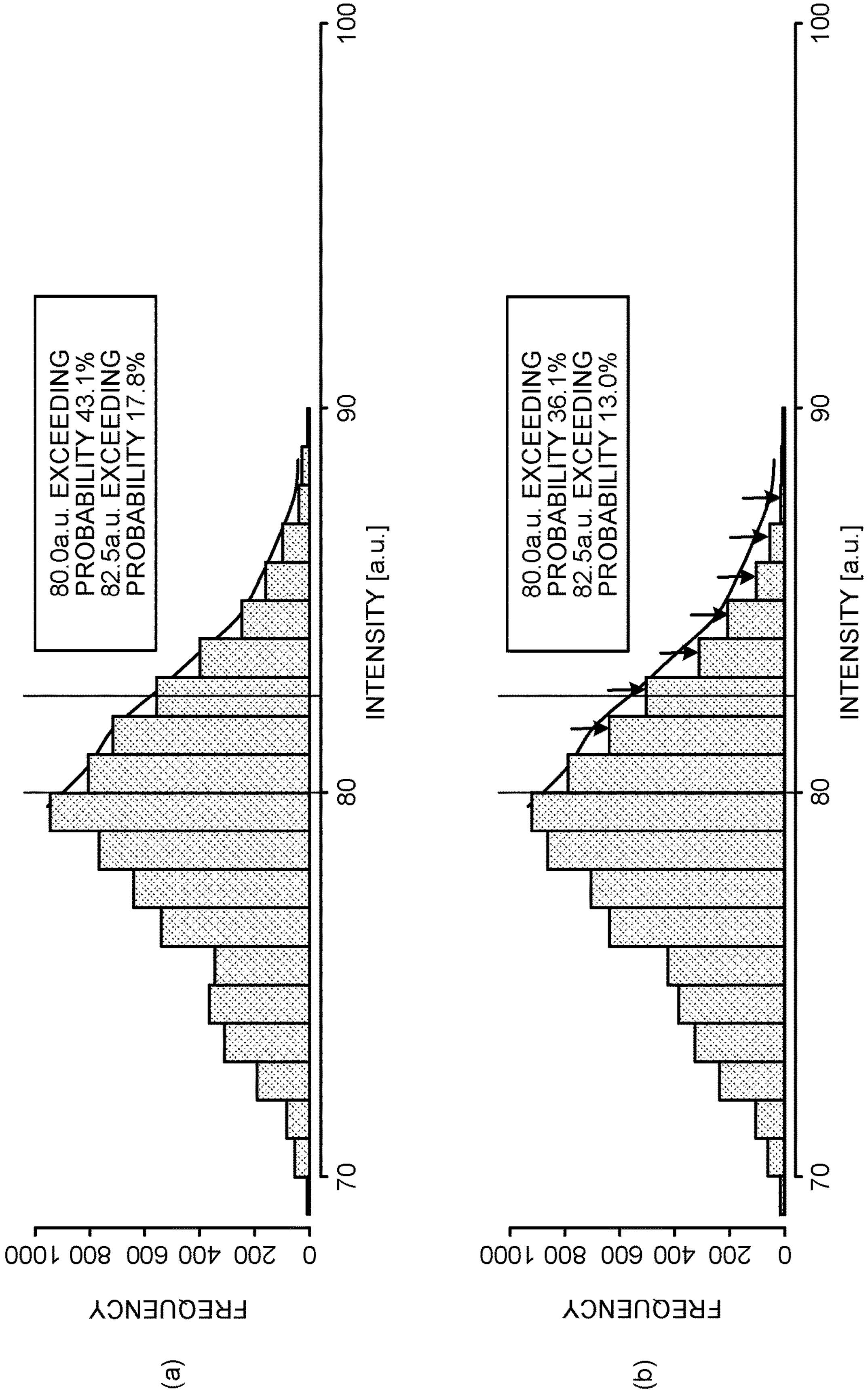
FIG. 14 is a diagram illustrating strength distributions in a case in which manufacturing conditions of subsequent processes are changed based on quality prediction results by the method of the related art and the method of the present invention.

(a) of FIG. 14 illustrates an intensity distribution in a case in which the manufacturing conditions of the subsequent processes are changed based on the prediction result by the quality prediction method of the related art. In addition, (b) of the figure illustrates an intensity distribution in a case in which the manufacturing conditions of the subsequent processes are changed based on the prediction result by the quality prediction method according to the present embodiment. As illustrated in the figure, variation in the strength can be reduced by using the quality prediction method according to the present embodiment.

As explained above, in the result data stored in the result database of the quality prediction method according to the present embodiment, the following can be performed. That is, in the predetermined ranges of the metal material in the final process, it is possible to trace and combine precise result data of hardness or presence or absence of a defect and the manufacturing conditions of all the processes while considering result data such as presence or absence of replacement of the leading and tail ends, presence or absence of replacement of the front and rear surfaces, and cutting positions. Then, since a prediction value under any manufacturing conditions is calculated based on a quality prediction model generated from the result database constructed in that way, the quality of the metal material can be predicted with high accuracy.

Example 2

An example of the quality abnormality analysis method according to the present embodiment is explained. In the present example, the quality abnormality analysis method according to the present embodiment is applied to strength prediction of a certain type of a cold-rolled thin steel sheet and a quality abnormality is analyzed based on a prediction result of quality.

Figure 15:
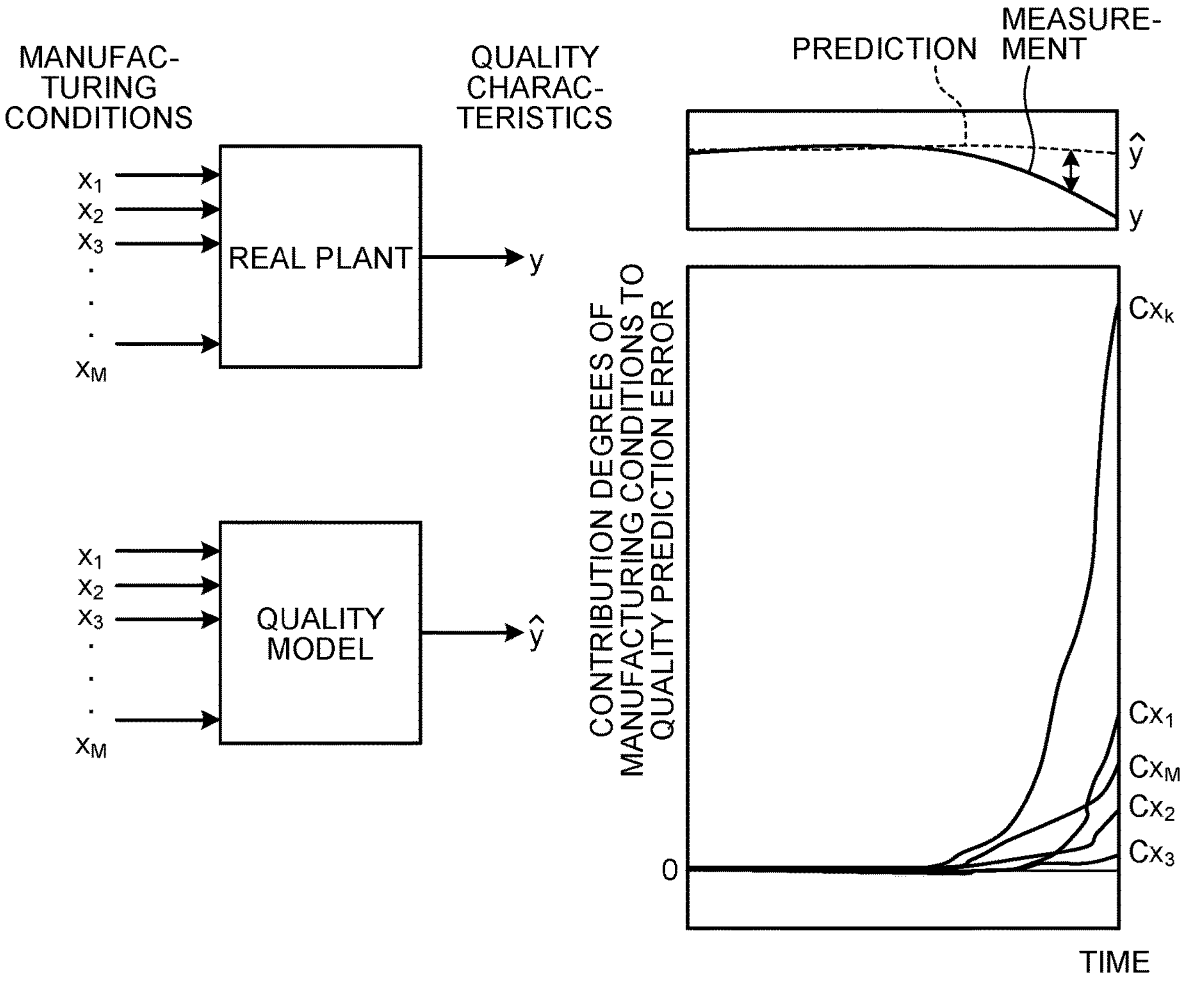
FIG. 15 is a diagram illustrating an overview of a quality abnormality analysis method according to the embodiment of the present invention.

FIG. 15 illustrates an overview of the quality abnormality analysis method according to the present embodiment. In the figure, y represents an actual value of strength, y^ represents a prediction value of strength, and $x_1 \ldots x_M$ represents actual values of manufacturing conditions up to the steelmaking process, the hot rolling process, and the cold rolling process. In the quality abnormality diagnosis method, quality contribution degrees $Cx_1 \ldots Cx_M$ of explanatory variable $x_1 \ldots x_M$ to a prediction error y−y^ are calculated and presented using the quality prediction model.

Here, a reason for calculating a quality prediction error is as follows. It is conceived that a reason why the quality prediction error increases is that a relation between the manufacturing conditions and the quality in the manufacturing process of the related art is a different relation. Therefore, when the quality prediction error increases, an abnormality occurs in a plant or a product is manufactured under manufacturing conditions deviating from the range of the related art and an abnormality also occurs in the quality of a product.

Quality contribution degrees of the manufacturing conditions input to the quality prediction model can be calculated by, for example, the following Formula (2). In the following Formula (2), $Cx_k$ represents a quality contribution degree, $a_k$ represents a standard partial regression coefficient, and $x_k$ with an overline represents an average value of an explanatory variable $x_k$.

$$Cx_k = |a_k||x_k - \overline{x}_k| \quad (2)$$

An explanatory variable (a manufacturing condition) having the largest quality contribution degree Calculated by the above Formula (2) is considered to be a cause of the quality abnormality of the product. Note that, in the present example, a PLS regression model is used as the quality prediction model and the absolute value of a standard partial regression coefficient is used as the quality contribution degree. An average value of the explanatory variables $x_k$ is an average of explanatory variables calculated based on normal data used in creating the PLS regression model.

Figure 16:
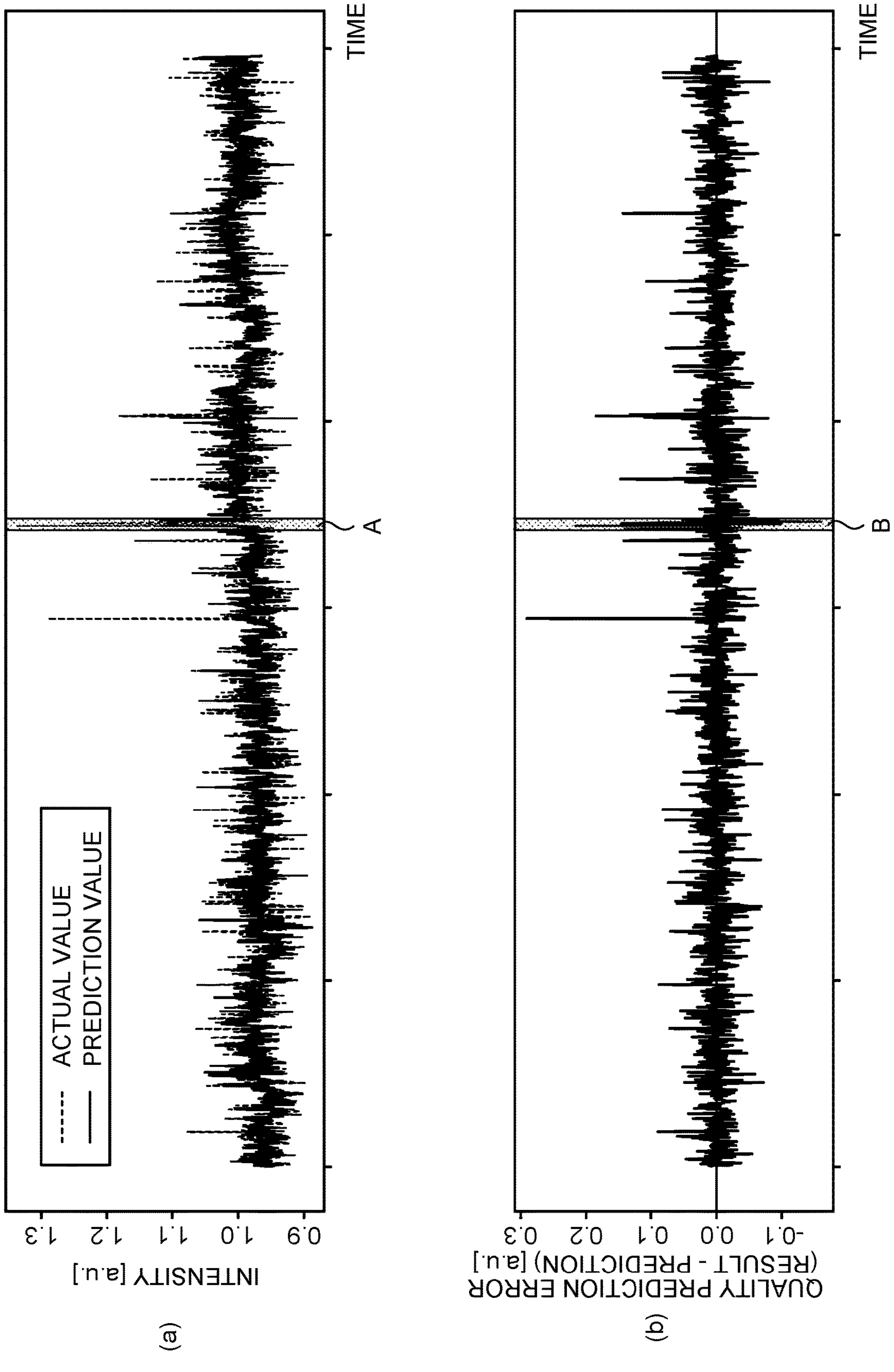
FIG. 16 is an example of the quality abnormality analysis method according to the embodiment of the present invention and illustrates transition of an actual value, a prediction value, and a quality prediction error (actual value-prediction value) of an objective variable (strength).

(a) of FIG. 16 illustrates transition of an actual value and a prediction value of an objective variable (strength) in an example of the quality abnormality analysis method according to the present embodiment. In addition, (b) of the figure illustrates transition of a quality prediction error (the actual value—the prediction value) of the objective variable (strength). In the figure, in sections indicated by shading (see an A part and a B part), quality defects in which the actual value of the strength is larger compared with the other sections occur. In the present example, a cause of the quality abnormality was analyzed focusing on the shaded sections.

Figure 17:
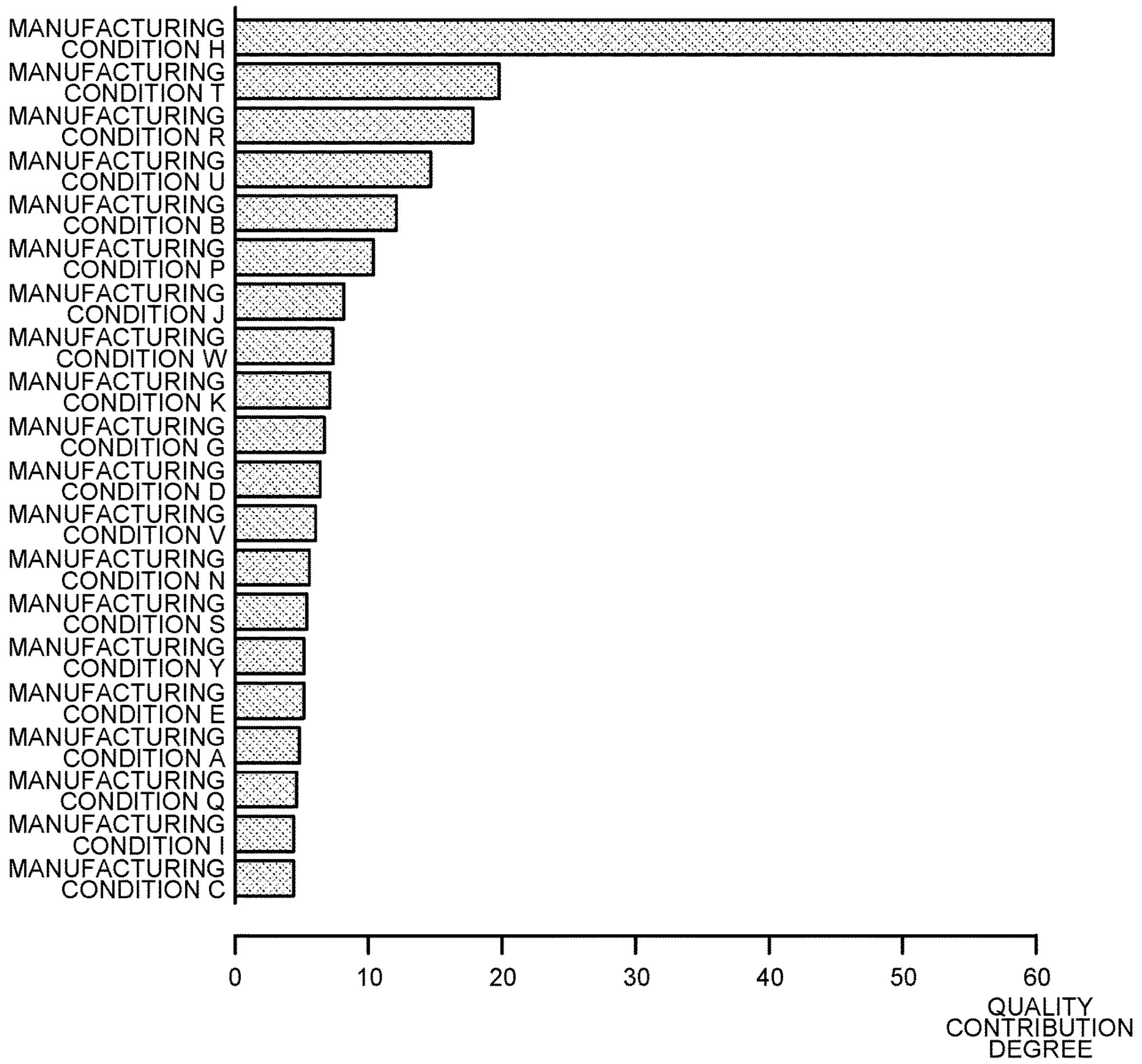
FIG. 17 is an example of the quality abnormality analysis method according to the embodiment of the present invention and illustrates a diagram in which only top twenty values obtained by time-integrating quality contribution degrees of explanatory variables (manufacturing conditions) in a shaded section are drawn in a histogram in descending order.

FIG. 17 illustrates, about quality contribution degrees of explanatory variables (manufacturing conditions), only top twenty time-integrated values in the shaded sections (see the A part and the B part) in FIG. 16 drawn as histograms in descending order. As illustrated in FIG. 17, when the quality prediction error exceeds a predetermined value, the explanatory variables (the manufacturing conditions) are arranged in descending order of the time integral values of the quality contribution degrees, whereby an explanatory variable estimated as contributing to the quality abnormality is clarified. In the present example, as illustrated in the figure, since a quality contribution degree of a manufacturing condition H (for example, a cooling condition of the cold rolling process) is extremely larger compared with the others conditions, the manufacturing condition H is focused.

Figure 18:
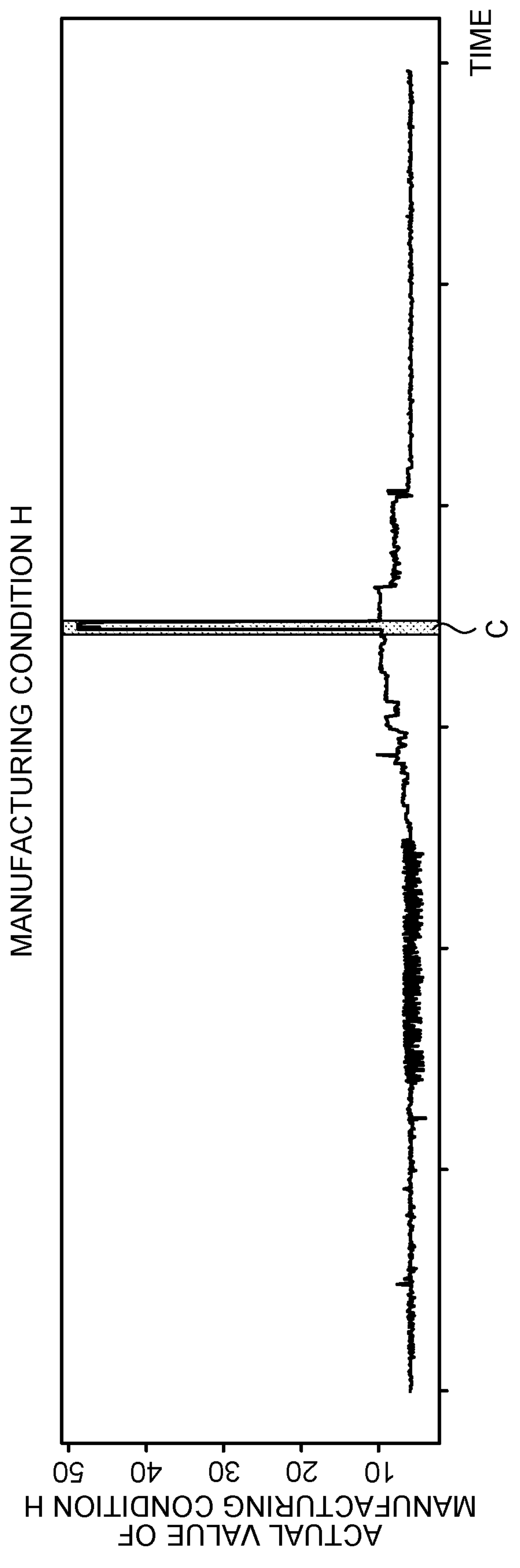
FIG. 18 is a diagram illustrating transition of a manufacturing condition H in FIG. 17.

FIG. 18 illustrate transition of the manufacturing condition H (for example, the cooling condition of the cold rolling step). As illustrated in the figure, a value of the manufacturing condition H is extremely large in a shaded section (see a C part), that is, a section where the strength is continuously extremely large. Consequently, it is seen that the cause of the abnormality only has to be analyzed by focusing on the manufacturing condition H and that the manufacturing condition H relates to the quality abnormality. As explained above, by using the quality abnormality analysis method according to the present embodiment, it is possible to identify the cause of the quality abnormality of the product from, for example, about 1000 kinds of manufacturing conditions.

In addition, with the quality abnormality analysis method according to the present embodiment, as illustrated in FIG. 17, the manufacturing condition contributing to the quality is clarified. Therefore, the following can be performed. First, the quality of a final product is predicted by the quality prediction model at a stage halfway in manufacturing, that is, a stage when any manufacturing process before implementing the final manufacturing process ends. Then, based on a result of the prediction, it is possible to select and change a manufacturing condition of a subsequent manufacturing process, the manufacturing condition having a high quality contribution degree and being changeable.

It is also possible to determine, based on the optimization problem indicated by the above Formula (1), for the selected changeable manufacturing condition, the quality of the final product to fall within a preset control range over the entire length of the product. Consequently, in a method of manufacturing a metal material manufactured through a plurality of manufacturing processes, it is possible to manufacture a metal material with satisfactory product quality over the entire length of the product.

The quality prediction model generation method, the quality prediction model, the quality prediction method, the method of manufacturing a metal material, the quality prediction model generation device, the quality prediction device, the quality abnormality analysis method, the method of manufacturing a metal material, and the quality abnormality analysis device according to the present invention are specifically explained above with reference to the embodiment and the examples for carrying out the invention. However, the gist of the present invention is not limited to these descriptions and has to be broadly interpreted based on the description of the claims. It goes without saying that various changes, modifications, and the like based on these descriptions are also included in the gist of the present invention.

For example, the integrated process result editing unit 16 explained above specifies the predetermined range considering the presence or absence of replacement of the leading and tail ends of the metal material, the presence or absence of replacement of the front and rear surfaces, and the cutting positions in the processes. However, in some cases, the processes of the replacement of the leading and tail ends of the metal material, the replacement of the front and rear surfaces of the metal material, and cutting of the metal material do not always include all the processes. Therefore, the integrated process result editing unit 16 may specify the predetermined range considering at least one or more of result data of the presence or absence of replacement of the leading and tail ends of the metal material, the presence or absence of replacement of the front and rear surfaces of the metal material, and the cutting positions of the metal material.

REFERENCE SIGNS LIST

1 QUALITY PREDICTION DEVICE
11 MANUFACTURING RESULT COLLECTION UNIT
12 MANUFACTURING RESULT EDITING UNIT
13 LEADING AND TAIL ENDS REPLACEMENT RESULT COLLECTION UNIT
14 FRONT AND REAR SURFACE REPLACEMENT RESULT COLLECTION UNIT
15 CUTTING RESULT COLLECTION UNIT
16 INTEGRATED PROCESS RESULT EDITING UNIT
17 RESULT DATABASE
18 MODEL GENERATION UNIT
19 QUALITY PREDICTION UNIT
2 QUALITY ABNORMALITY ANALYSIS DEVICE
21 QUALITY PREDICTION UNIT
22 QUALITY EVALUATION UNIT
23 QUALITY PREDICTION ERROR CALCULATION UNIT
24 QUALITY CONTRIBUTION CALCULATION UNIT
25 QUALITY ABNORMALITY CAUSE PRESENTATION UNIT
3 REAL PLANT
4 DISPLAY UNIT

The invention claimed is:

1. A method of manufacturing a product being a metal material manufactured through a plurality of manufacturing processes, the method comprising:

a quality prediction step of predicting quality of the product by inputting manufacturing conditions to a quality prediction model; wherein the quality prediction model is a model for predicting quality of metal material manufactured through one or a plurality of processes and the quality prediction model is generated through:

a first collection step of collecting manufacturing conditions of processes for each of predetermined ranges of the metal material;

a second collection step of evaluating and collecting, for each of the predetermined ranges, the quality of the metal material manufactured through the processes;

a storage step of storing manufacturing conditions of the processes and the quality of the metal material manufactured under the manufacturing conditions in correlation for each of the predetermined ranges; and a quality prediction model generation step of generating, from the stored manufacturing conditions for each of the predetermined ranges in the process, the quality prediction model for predicting the quality of each of the predetermined ranges of the metal material;

a quality evaluation step of calculating a quality evaluation value of an actual product manufactured through the manufacturing processes;

a quality prediction error calculation step of calculating, as a quality prediction error, a difference between a quality prediction value obtained as an output of the quality prediction step and the quality evaluation value wherein the quality prediction error indicates that a relation between the manufacturing conditions and the quality has been changed from a prior relationship;

a quality contribution calculation step of calculating quality contribution degrees of the input manufacturing conditions when predicting the quality of the product using the quality prediction model;

a quality abnormality cause presentation step of presenting, based on the quality prediction error and the quality contribution degrees, a manufacturing condition causing a quality abnormality of the product;

a predicting step of predicting quality of a final product with the quality prediction model generated by a quality abnormality analysis;

a determining step of determining a manufacturing condition of a manufacturing process based on a result of the prediction step; and an operating step of operating the plurality of manufacturing processes under the determined manufacturing condition.

2. The method according to claim 1, wherein the quality contribution calculation step includes calculating the quality contribution degrees based on partial regression coefficients of the quality prediction model and values of variables.

3. The method according to claim 1, wherein the quality abnormality cause presentation step includes presenting, in time series, a temporal integral value of the quality prediction error and the quality contribution degrees of the manufacturing conditions and visualizing and presenting temporal transition of the quality prediction error and candidates of a manufacturing condition causing the quality abnormality.

4. The method according to claim 1, wherein the quality abnormality cause presentation step includes, when the quality prediction error exceeds a predetermined value, focusing on a manufacturing condition having a quality contribution degree, and sequentially presenting, as candidates of a manufacturing condition causing the quality abnormality, the manufacturing conditions in order from a manufacturing condition having a largest temporal integral value of the quality contribution degree.

5. The method according to claim 1, wherein the quality prediction model is generated by using machine learning including linear regression, local regression, principal component regression, PLS regression, neural network, regression tree, random forest, and XGBoost.

6. The method according to claim 1, wherein the predetermined ranges are fixed length intervals in a longitudinal direction of the metal material.

* * * * *